US010178508B1

(12) United States Patent
Diamanti et al.

(10) Patent No.: US 10,178,508 B1
(45) Date of Patent: Jan. 8, 2019

(54) REAL-TIME, LOCATION-AWARE MOBILE DEVICE DATA BREACH PREVENTION

(71) Applicant: INTERNATIONAL BUSINESS MACHINES CORPORATION, Armonk, NY (US)

(72) Inventors: Gary F. Diamanti, Wake Forest, NC (US); Iwao Hatanaka, Actom, MA (US); Stephen J. Kenna, Cary, NC (US); Mauro Marzorati, Lutz, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/791,413

(22) Filed: Oct. 24, 2017

Related U.S. Application Data

(63) Continuation of application No. 15/644,985, filed on Jul. 10, 2017.

(51) Int. Cl.
*H04W 4/029* (2018.01)
*H04W 12/06* (2009.01)
(Continued)

(52) U.S. Cl.
CPC .......... *H04W 4/029* (2018.02); *G06N 99/005* (2013.01); *H04W 12/06* (2013.01); *H04W 12/08* (2013.01)

(58) Field of Classification Search
CPC ....... H04W 4/027; H04W 4/046; H04W 4/12; H04W 28/04; H04W 4/22; H04W 64/00;
(Continued)

(56) References Cited

U.S. PATENT DOCUMENTS 5,748,084 A  5/1998 Isikoff
8,015,133 B1  9/2011 Wu et al.
(Continued)

FOREIGN PATENT DOCUMENTS

WO  2015021484 A1  2/2015

OTHER PUBLICATIONS

Garcia-Otero et al, "Location aided cooperative detection of primary user emulation attacks in cognitive wireless sensor networks using nonparametric techniques", copyright 2016, Journal of Sensors, vol. 216, Article 9571592, accessed via the Internet at <https://www.hindawi.com/journals/js/2016/9571592/>, 8 pages.
(Continued)

*Primary Examiner* — Diane Mizrahi
(74) *Attorney, Agent, or Firm* — Feb R. Cabrasawan; Amy J. Pattillo

(57) ABSTRACT

A cognitive security service learns regular locations and usage of one or more mobile devices for a user at multiple times based on aggregated location and usage information reported by the one or more mobile devices via a network. The cognitive security service forecasts one or more selected locations and selected usage by the user with a highest probability of predictability at one or more future sequential times from among the regular locations and usage. The cognitive security service, responsive to detecting a current location of the one or more mobile devices for the user deviates from the one or more selected locations and selected usage beyond a threshold, triggers, via the network, one or more secondary levels of authentication at the one or more mobile devices, wherein the one or more secondary levels of authentication prevent data breaches on the one or more mobile devices through real-time, location aware data security.

8 Claims, 12 Drawing Sheets

(51) Int. Cl.
*H04W 12/08* (2009.01)
*G06N 99/00* (2010.01)

(58) Field of Classification Search
CPC .. H04W 76/007; H04W 88/06; G08B 25/008; G08B 19/005; G08B 27/003
See application file for complete search history.

(56) References Cited

U.S. PATENT DOCUMENTS

| | | | |
|---|---|---|---|
| 8,437,700 | B2 | 5/2013 | Mody et al. |
| 8,495,700 | B2 | 7/2013 | Shahbazi |
| 8,793,761 | B2 | 7/2014 | Chow et al. |
| 8,856,057 | B2 | 10/2014 | Ionson |
| 8,875,239 | B2 | 10/2014 | Chow et al. |
| 9,038,193 | B2 | 5/2015 | Burgess et al. |
| 9,179,315 | B2 | 11/2015 | Raleigh |
| 2003/0084321 | A1 | 5/2003 | Tarquini et al. |
| 2015/0200914 | A1 | 7/2015 | Svigals |
| 2016/0057623 | A1 | 2/2016 | Dutt et al. |
| 2017/0018167 | A1* | 1/2017 | Dey ................ G08B 25/008 |
| 2017/0348854 | A1* | 12/2017 | Oleynik ............ B25J 9/1605 |
| 2018/0032997 | A1* | 2/2018 | Gordon ............ G06Q 20/3224 |

OTHER PUBLICATIONS

Rajkomar et al., "Understanding safety-critical interactions with a home medical device through Distributed Cognition," Journal of Biomedical Informatics 56 (2015), pp. 179-194, accessed via the Internet at <http://ac.els-cdn.com/S1532046415001124/1-s2.0-S1532046415001124-main.pdf?_tid=dbe1fdba-626b-11e7-9fd4-00000aacb362&acdnat=1499360285_5a0f5fdaa779228735f2ae71805ca968>, 16 pages.

Buthpitiya, "Modeling Mobile User Behavior for Anomaly Detection", Carnegie Mellon University PhD Dissertation, 2014, accessed via the Internet at <http://repository.cmu.edu/dissertations/362/>, 189 pages.

Abah et al, "A Machine Learning Approach to Anomaly-based Detection on Android Phone Platforms", International Journal of Network Security & Its Applications (IJNSA) vol. 7, No. 6, Nov. 2015, accessed via the Internet at <https://arxiv.org/ftp/arxiv/papers/1512/1512.04122.pdf>, 21 pages.

Thing et al, "Mobile Phone Anomalous Behavior Detection for Real-time Information Theft Tracking", CYBERLAWS 2011: The Second International Conference on Technical and Legal Aspects of the e-Society, Feb. 23, 2011, accessed via the Internet at <file:///Users/amy/Downloads/cyberlaws_2011_full.pdf>, 47 pages.

Ashbrook et al., "Using GPS to learn significant locations and predict movement across multiple users," Personal and Ubiquitous Computing 7.5 (2003): pp. 275-286, 15 pages.

Buschkes et al., "How to increase security in mobile networks by anomaly detection," Computer Security Applications Conference, 1998 Proceedings, 14th Annual, IEEE, 1998, 10 pages.

Sun et al., "Enhancing security using mobility-based anomaly detection in cellular mobile networks," IEEE Transactions on Vehicular Technology 55.4 (2006): pp. 1385-1396, 12 pages.

"List of IBM Patents or Patent Applications Treated as Related", dated Oct. 24, 2017, 2 pages.

U.S. Appl. No. 15/644,985, filed Jul. 10, 2017, In re Diamanti, 64 pages.

Office Action, dated Feb. 7, 2018, U.S. Appl. No. 15/644,985, filed Jul. 10, 2017, In re Diamanti, 49 pages.

Salmeron, Jose L, "A fuzzy grey cognitive maps-based intelligent security system", 2015 IEEE International Conference on Grey Systems and Intelligent Services (GSIS), Aug 18, 2015, pp. 29-32, 4 pages.

Liu et al, "Secure D2D communication in large-scale cognitive cellular networks: a wireless power transfer model", IEEE Transactions on Communications, 2015, 14 pages.

Sharma et al, "Advances on Security Threats and Countermeasures for Cognitive Radio Networks: A Survey", IEEE communications Surveys and Tutorials, vol. 17, No. 2, 2015, 21 pages.

Shen et al., "Performance Analysis of Touch-Interaction Behavior for Active Smartphone Authentication", 2015, IEEE Transactions on Information Forensics and Security, 16 pages.

Notice of Allowance, dated Jul. 19, 2018, U.S. Appl. No. 15/644,985, filed Jul. 10, 2017, In re Diamanti, 9 pages.

\* cited by examiner

US 10,178,508 B1

REAL-TIME, LOCATION-AWARE MOBILE DEVICE DATA BREACH PREVENTION

CROSS REFERENCE TO RELATED APPLICATIONS

This application is a continuation of commonly assigned U.S. patent application Ser. No. 15/644,985, filed Jul. 10, 2017, which is hereby incorporated herein by reference.

BACKGROUND

1. Technical Field

One or more embodiments of the invention relate generally to data processing and particularly to preventing data breaches on mobile devices through real-time, location aware data security.

2. Description of the Related Art

The number of people who carry and use portable computing devices, which may also be referred to as "mobile devices", on a daily basis continues to increase. Because mobile devices are portable, users frequently carry not only the mobile device, but the data on that mobile device, into areas that are not fully secured.

BRIEF SUMMARY

In one embodiment, a method is directed to learning, by a computer system, a plurality of regular locations and usage of one or more mobile devices for a user at a plurality of times based on aggregated location and usage information reported by the one or more mobile devices via a network. The method is directed to forecasting, by the computer system, one or more selected locations and selected usage by the user with a highest probability of predictability at each of a plurality of future sequential times from among the plurality of regular locations and usage. The method is directed to, responsive to detecting a current location of the one or more mobile devices for the user deviates from the one or more selected locations and selected usage beyond a threshold specified by the user, triggering, by the computer system, via the network, one or more secondary levels of authentication at the one or more mobile devices, wherein the one or more secondary levels of authentication prevent data breaches on the one or more mobile devices through real-time, location aware data security.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
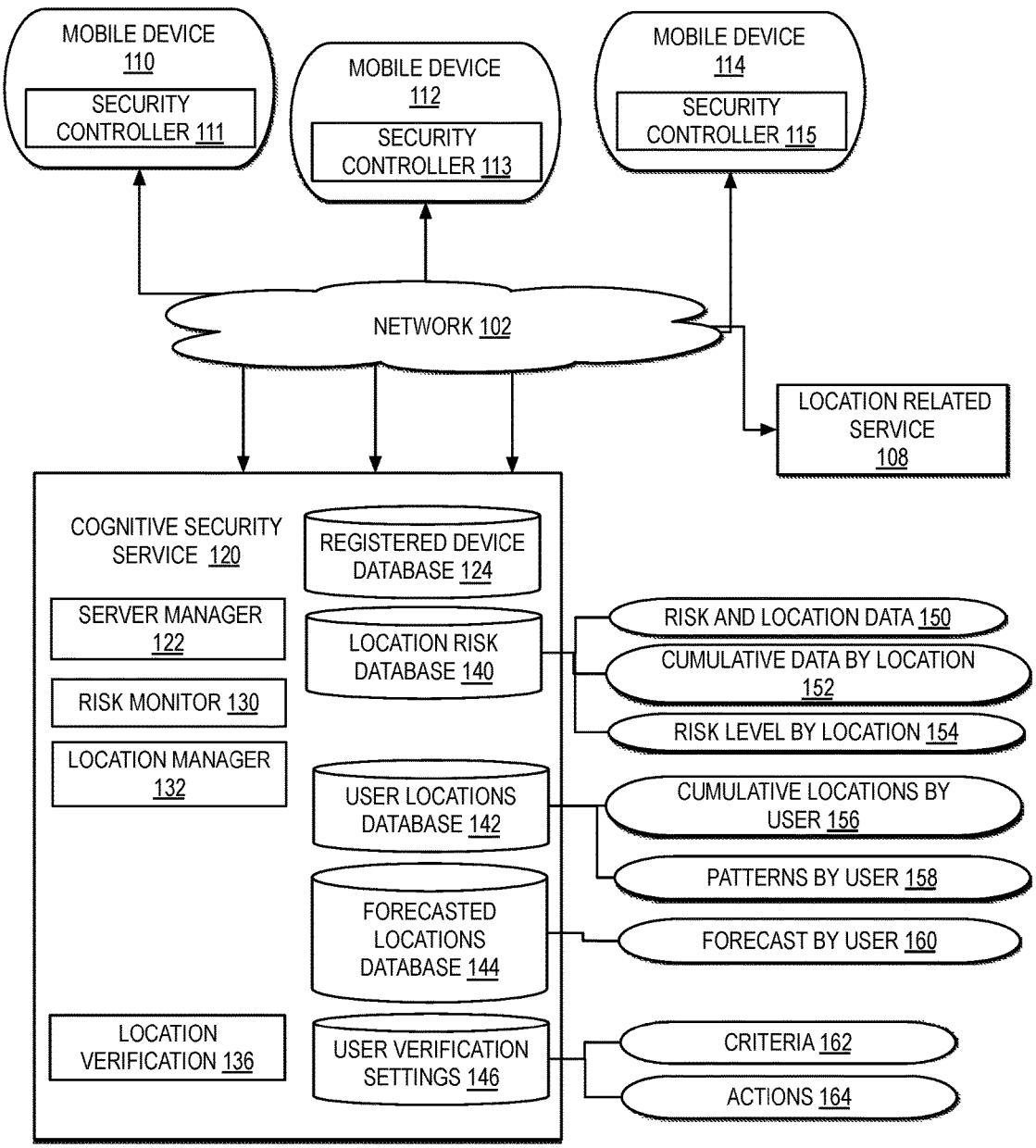
FIG. 1 illustrates a block diagram of one example of a cognitive security service for providing real-time, location aware mobile device data breach prevention.

FIG. 1 illustrates a block diagram of one example of a cognitive security service for providing real-time, location aware mobile device data breach prevention.

In one example, a user may carry one or more mobile devices with the user throughout the day, such as a user carrying one or more of mobile device 110, mobile device 112, and mobile device 114 at different times during the day and in different environments. In one example, a mobile device may represent a portable computing device, such as, but not limited to, a smart device, a smartphone, a table, a smart watch, and a laptop computer.

Each mobile device, from among mobile device 110, mobile device 112, and mobile device 114, may include data that needs to be secured. While the mobile device may include password protection mechanisms to secure data, password protection alone may not be sufficient against the current types of data breaches that may occur if a user brings a mobile device into selected environments. In particular, a challenge to securing data on a mobile device is that the user may carry the mobile device outside of secured areas and there is a need to monitor whether the mobile device has been compromised in any way.

In one embodiment of the present invention, a cognitive security service 120 provides timely and reliable detection of security compromises to mobile devices, whether from the device being physically compromised or internally compromised. In one example, a device may be physically compromised if physically taken by an unauthorized user. In one example, a mobile device may be internally compromised if one or more software, network, or hardware layers of the mobile device is accessed or attempted to be accessed by an unauthorized user. Cognitive security service 120 may detect that a device has been compromised, with a minimized risk of a false positive, and respond by automatically and immediately curtailing further use or access to one or more types of functionality of a compromised device. In one example, one or more types of functionality of a compromised device may include, but are not limited to, access to data, access to application layers, access to network layers, and access to hardware layers.

In one example, to provide timely and reliable detection of security compromises to mobile devices, cognitive security service 120 may implement a service through one or more of a server manager 122, a risk monitor 130, a location manager 132, and a location verification 136, along with one or more databases such as, but not limited to, a location risk database 140, a user locations database 142, and a forecasted locations database 144. In addition, cognitive security service 120 may implement, on each mobile device, a security controller for communicating with cognitive security service 120 through a network 102, such as security controller 111 on mobile device 110, security controller 113 on mobile device 112, and security controller 115 on mobile device 114. In one example, one or more security protocols may be implemented to secure and verify communications via cognitive security service 120 and each of mobile device 110, mobile device 112, and mobile device 114 via network 102. Each of cognitive security service 102, security controller 111, security controller 113, and security controller 115 may apply security checks to validate incoming messages and data between one another over network 102 and from additional or alternate services. In addition, network 102 may include one or more layers that monitor information security within one or more networks, such as a cellular network within network 102, to provide for secure communication transmissions between cognitive security service 120 and each of mobile device 110, mobile device 112, and mobile device 114 via network 102.

In one example, the security controller of each mobile device may register with server manager 122, by one or more types of identifiers, such as, but not limited to, a device identifier, a user identifier, a group identifier, a network security identifier, and other identifiers that may allow server manager 122 to manage security for each mobile device. In another example, an administrator may automatically register each mobile device with server manager 122, and server manager 122 may push a registration authorization to the security controller of each registered mobile device. In one example, server manager 122 may manage the identifiers of registered mobile devices in a registered device database 124. In additional or alternate embodiments, additional or alternate types of secured communication channels may be established between server manager 122 and security controllers of monitored mobile devices.

In one example, risk monitor 130 may monitor risk data reported by one or more sources, by location, and store the risk data in a location risk database 140. Risk monitor 130 may filter risk and location data 150, accumulate risk data for a location as cumulative data by location 152, analyze the cumulative data for a particular location, and dynamically identify an overall risk level for a location from the cumulative data as risk level by location 154. In addition, risk monitor 130 may dynamically identify the risk level for a location from the cumulative data in risk level by location 154 for a particular time period. In one example, risk monitor 130 may collect risk and location data 150 from one or more types of devices. In one example, the security controller of each mobile device, such as mobile device 110, mobile device 112, and mobile device 114, may function as sources of risk data, reporting data by location that indicates the risk of security compromises at the location. In another example, risk monitor 130 may collect risk data by location from publicly available databases or services providing live or periodic security related reports for a location and historical security risks for locations, which may be accumulated from reports and maps, for example. For example, cognitive security service 120 may push or pull risk data from one or more services via network 102, such as location related service 108. In addition, risk monitor 130 may collect risk data by monitoring for primary user emulation (PUE) attacks on one or more networks that are indicative of the risk of the using the networks, locally or through an external service such as location related service 108, where the risk data may be determined using parametric, nonparametric and other strategies for detecting PUE relay and replay attacks.

In addition, in one example, location manager 132 may monitor locations of multiple mobile devices associated with one or more users to detect location based patterns of movement for a user. In one example, the security controller of each mobile device, such as security controller 111, security controller 113, and security controller 115, may continuously or periodically report location data to location manager 132 for feedback and assessment. Location manager 132 may accumulate the reported locations from multiple mobile devices, for one or more user accounts associated with each of the mobile devices, in a user locations database 142, as cumulative locations by user 156. In addition, location manager 132 may dynamically analyze cumulative locations by user 156 for a particular user to identify patterns of movement for the particular user at particular locations and times, as patterns by user 158. Location manager 132 continually ingests and learns user patterns based on the physical location of monitored mobile devices throughout each day. As location manager 132 receives updated locations and adds the updated locations to user locations database 142, location manager 132 may dynamically adjust the identified patterns of movement for a user in patterns by user 158.

In addition, in one example, location manager 132 may forecast where the physical location of a mobile device should be at any given time based on the patterns of movement identified for a user. In one example, location manager 132 identifies a forecasted location based on the patterns of movement for a user at a given time in patterns by user 158 of user locations database 142. In one example, location manager 132 may update the forecasted locations for a user at a current time and at future points in time in a forecasted locations database 144, as forecast by user 160. Location manager 132 may continuously update the forecasted location of each mobile device by user in forecast by user 160 as patterns by user 158 are updated, and other feedback received. Forecast by user 160 may also include forecasts based on time and other parameters, including one or more forecast locations or ranges of forecast locations for each chronological time step.

In addition, in forecasting the location of a user, location manager 132 may access one or more types of metadata that describes and gives information relevant to a user's potential movements. For example, location manager 132 may access one or more of one or more calendars, one or more travel itineraries, or other location information that may be accessed from a mobile device or from another service that may share user scheduling information, such as an online calendaring service authorized by the user to provide calendaring data to location manager 132. In one example, a user may specify the services authorized by the user to provide additional metadata relevant to the user's forecasted location with the user registration record in registered device database 124. For example, a user may specify access information for an external service such as location related service 108.

In addition to forecasting locations of users of mobile devices, location manager 132 correlates a forecasted location in forecasted locations database 144 with a risk associated with the location at the time and conditions forecasted based on the location based risk assessments in location risk database 140. Location manager 132 may further specify the risk assessment for a forecasted location based on user experiences at the forecasted location.

In one example, location manager 132 may transmit forecasted locations, risk assessments for the forecasted locations, and other criteria to the security controller of each mobile device for processing and storage by the security controller of the mobile device, along with timestamps, location related information, and other collected data.

In addition, in one example, location verification 136 may perform verification of a current location reported by the security controller of a mobile device against the forecasted location for the mobile device at that time in forecasted locations database 144. In one example, user verification settings 146 specifies one or more criteria 162 specifying how location verification 136 evaluates a current location against a forecasted location. For example, criteria 162 may specify, by user, by mobile device, and other criteria, the size of radius surrounding a forecasted location within which a mobile device location is expected at a particular time, the risk level tolerated for a forecasted location, and other thresholds. In one example, if a mobile device location is outside the radius surrounding a forecasted location or the risk level for the forecasted location is higher than the threshold, user verification settings 146 may further specify what types of actions 164 should be taken by location verification 136. In one example, actions 164 may trigger location verification 136 to send additional identification requirements to the security controller of the mobile device triggering the response.

As illustrated, cognitive security service 120 is self-learning and integrates continuous location based risk assessments, continuous forecasted locations based on previously detected locations and patterns, and current location information reported by mobile devices and other sources to quickly detect anomalies in mobile device usage indicating the mobile device is compromised in some way. In one example, an anomaly may indicate a deviation from forecasted mobile device usage beyond a threshold amount. In addition, cognitive security service 120 is adaptive, and self-learning, using aggregated location and metadata about a user and the user's mobile devices to train itself, detect patterns, and improve the accuracy of the forecasted locations.

As illustrated, cognitive security service 120 continuously sends updates to security controllers of mobile devices. In one example, if cognitive security service 120 detects that an actual device location of a mobile device matches the forecasted location within an allocated risk tolerance level, cognitive security service 120 sends an update indicating that operation falls within a forecasted location range for a user, and that no action is triggered. In one example, if cognitive security service 120 detects that an actual device location of a mobile device does not match a forecasted location or is detected to be within a high-risk location that is outside the user specified risk threshold limits, cognitive security service 120 may lock access to the mobile device and trigger an action requiring the security controller of the mobile device to require secondary levels of authentication to access the mobile device. In one example, locking access to the mobile device may include locking access to one or more types of functionality or layers of the mobile device, such as locking access to one or more input, output, or network interfaces of the mobile device, locking access to one or more applications of the mobile device, and locking access to memory or storage areas of the mobile device or accessible via the mobile device. In addition, if a security controller of a mobile device does not receive a communication from cognitive security service 120 within a particular time period, the security controller may trigger itself to require secondary levels of authentication to access the device. When the security controller of a mobile device triggers a requirement for secondary levels of authentication, if the mobile device has been compromised in some way, the security controller ensures that data and applications cannot be accessed through the mobile device and that sensitive information accessible via a mobile device cannot be compromised.

In one example, secondary levels of authentication may include one or more types of authentication in addition to or in conjunction with primary levels of authentication that are required for general access to the mobile device. For example, a primary level of authentication may include a user providing fingerprint identification or a numerical password to access a mobile device. A secondary level of authentication may require that a user reenter the fingerprint identification or numerical password to continue to access a mobile device. In another example, a secondary level of authentication may require the user to enter an additional or alternate type of authentication input from the type of authentication required for the primary level of authentication.

In one example, while cognitive security service 120 may communicate with only one mobile device, in the example, by cognitive security service 120 interfacing and communication with multiple mobile devices and other data sources, location manager 132 is able to aggregate and analyze data from multiple mobile devices and other sources for a particular user or group of users, including aggregating data observed from multiple sources for the same device and data received from one or more other services, for a large distributed network of mobile devices, through cognitive learning and analysis, and also dynamically control each individual mobile device for lockdown and recovery based on the criteria and actions uniquely specified for each mobile device. While one or more of mobile device 110, mobile device 112, and mobile device 114 may incorporate one or more elements of cognitive security service 120 into a security controller or other agent for performing local aggregation and analysis of locations patterns for a user, by location manager 132 aggregating data observed from multiple devices in communication with cognitive security service 120, data for a particular location can be more accurately verified when provided from multiple sources, cognitive analysis of user patterns and forecasted locations improves with an increase in the number of data points available from multiple mobile devices registered to a single user, and risk analysis is more robust when aggregated and analyzed from data reported by multiple mobile devices.

In one example, cognitive security service 120 may also integrate additional types of data and additional types of self-training to improve the accuracy of assessing the risks of particular locations, performing distributed mobile device forecasting that a user will have a mobile device at higher risk locations, and managing security and control of distributed mobile devices through verification with secondary levels of identification requirements. In one example, while one embodiment of cognitive security service 120 as described implements a cognitive service for distributed mobile device location learning and forecasting and mobile device security and control, cognitive security service 120 may also integrate protocol reference models (PRMs), as well as components of one or more cognitive and non-cognitive, mesh-enabled and non-mesh enabled nodes, in a network to enable the combination of information from various network layers to determine spectrum utilization. In another example, while one embodiment of cognitive security service 120 as described implements a cognitive service for distributed mobile device location learning and forecasting and mobile device security and control, cognitive security service 120 may also apply cognitive and non-cognitive processes for security breach prediction and detection based on detecting open, incomplete or unknown network domains, where risk monitor 130 may identify risk levels by type of network domain or network domain location.

In one example, while individual mobile devices may include additional hardware specified for providing additional security protections for the individual mobile device, such as RF transmitters or physical locks, cognitive security service 120 is a lightweight solution that detects mobile device compromises with a minimum of a network connection via network 102 and a lightweight security controller application layer reporting a location of the mobile device. In addition, while individual mobile devices may include additional software components, separate from a security controller layer, for detecting potential security breaches, the security triggers provided to security controllers on individual mobile devices are independent of any particular mobile device and less prone to unauthorized manipulation if a mobile device has been compromised.

In one example, while mobile device 110, mobile device 112, and mobile device 114 may be transportable between multiple locations, in additional or alternate embodiments, one or more of mobile device 110, mobile device 112, and mobile device 114 may also represent a mobile device physically or wirelessly tethered to one or more machines temporarily located in a fixed position or limited range position, such as an automated kiosk, voting machine, or robot that is intended to remain in a fixed position or limited range of locations for a period of time and may be accessed by multiple people. In one example, when a mobile device is tethered to one or more machines intended to remain in a fixed position or limited range of location for a period of time, for access by multiple people, the security controller of the mobile device may function in a mode where the security controller may capture video and audio within a region, perform initial threat assessments using image and audio recognition of the video and audio, along with using geolocation tracking for areas where the line of sight surrounding the mobile device is not captured or is inhibited, to perform an initial assessment of potential threats to the ongoing expected functionality of the machine. In addition, the security controller may transmit the video and audio and geolocation tracking data to cognitive security service 120 for aggregation with video and audio and geolocation data captured from other mobile devices and for analysis, to learn the types of behavior and sound that may indicate an attempt to compromise the expected performance of the one or more machines. Cognitive security service 120 may evaluate whether verification is required at one or more of the machines and, if threats are detected, send triggers to the security controller of the tethered mobile device to lock down one or more of the machines and send potential threat guidance to one or more administrators identified in the contact information associated with the mobile device.

Figure 2:
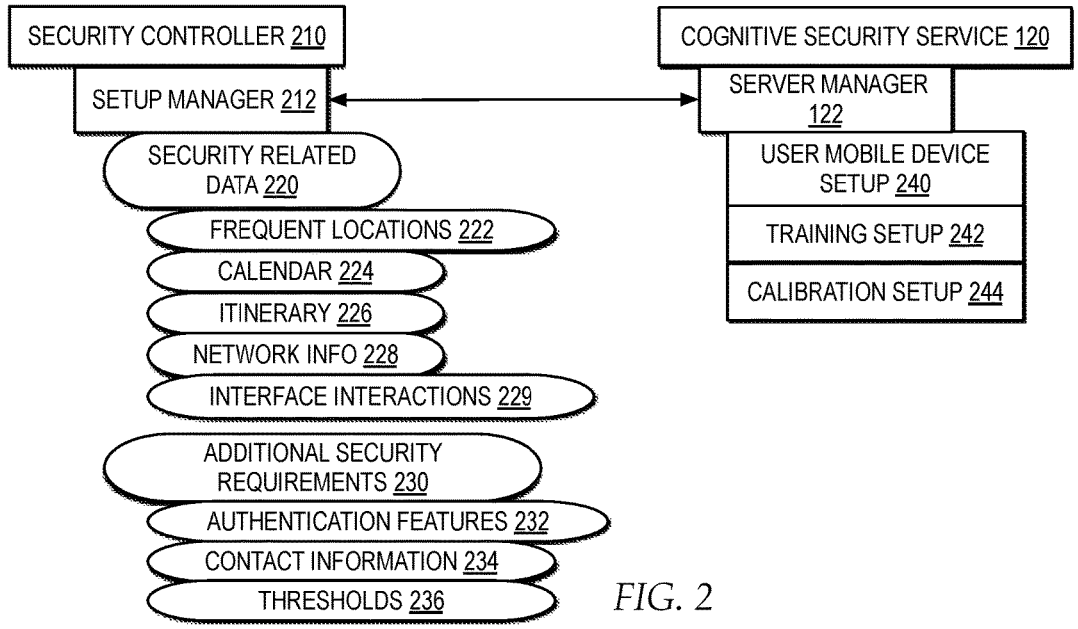
FIG. 2 illustrates a block diagram of one example of a process for setting up each of multiple mobile devices for breach detection and prevention management by a cognitive security service.

FIG. 2 illustrates a block diagram of one example of a process for setting up each of multiple mobile devices for breach detection and prevention management by a cognitive security service.

In one example, a security controller 210 of a mobile device is initially setup, along with setting up cognitive security service 120 to track and monitor use of the mobile device. In additional or alternate examples, additional or alternate data and processes may be implemented to setup cognitive security service 120 to track and monitor use of a mobile device.

In one example, security controller 210 may implement a setup manager 212 for setting up security related data 220 and additional security requirements 230 for a mobile device. Setup manager 212 may access one or more data storage locations and services via a network, in addition to accessing data stored locally at a mobile device.

In one example, setup manager 212 may setup security related data 220 including, but not limited to, frequent locations 222 including one or more locations that are frequently visited by a user, calendar 224 including one or more events scheduled for a user, itinerary 226 including one or more locations scheduled for a user, network info 228 including one or more public and private network identifiers and passwords used by a user and statistical indicators of regular network usage, and interface interactions 229 including one or more types of regular interactions by a user with input interfaces of the mobile device. In one example, calendar 224 may include one or more types of calendars, accessed from one or more calendaring service providers, such as, but not limited to, a work calendar and a home calendar. In one example, network info 228 may further include identifiers of public networks or other types of networks that are designated as trusted by the user or another entity. In one example, network info 228 may further include statistics regarding network usage, such as an average number of emails sent or received or an average amount of data accessed during particular time periods, events, or locations. In one example, interface interactions 229 may include multiple types of regular interactions with interfaces, such as applications regularly interacted with by time of day or event, patterns of touch operations including rhythm, strength, and angle of touch interaction behavior, network data regularly requested, audio regularly listened to, and other patterns of behavior of mobile device interaction and usage.

In one example, additional security requirements 230 may include authentication features 232 including one or more forms of authentication features required for secondary levels of authentication of a user at a mobile device, contact information 234 including one or more types of contact to make when mobile device is detected as potentially compromised, and thresholds 236 including one or more location thresholds specifying ranges, percentages, and other values indicating a threshold limit deviation of a current location from a forecasted location for triggering an anomaly.

In one example, authentication features 232 may include single step or multiple step authentication, with one or more steps specified or a randomized selection of steps enabled. In one example, authentication steps may include one or more types of authentication such as, but not limited to, a security password requirement, a fingerprint requirement, a facial recognition requirement, a pattern recognition requirement, a cognitive test requirement, and a voice recognition requirement.

In one example, contact information 234 may include contact information for a user or other entity that monitors the security of a mobile device such as, but not limited to, an emergency telephone number for receiving a text or phone call and an email address to alert the user or other entity that a potential compromise is detected. In addition, contact information 234 may identify the type of information to send to the user or other entity with an alert communication such as, but not limited to, a GPS location and an image captured from the camera function of a mobile device.

In one example, thresholds 236 may be further specified according to one or more additional parameters, such as, but not limited to, time, additional distance measurements, date, location, and area. In one example, a user may configure and calibrate the sensitivity of deviations indicative of an anomaly that are required for cognitive security service 120 to trigger additional security requirements at the user's mobile device.

In one example, setup manager 212 may communicate with server manager 122 of cognitive security service 120 to initiate setup. In one example, setup manager 212 may send one or more types of data from among security related data 220 and additional security requirements 230 to server manager 122, in addition to or as an alternative to locally managing security related data 220 and additional security requirements 230 at a particular mobile device.

In one example, server manager 122 may initiate user mobile device setup 240 for establishing an account for a mobile device for a user in registered device database 124. In addition, server manager 122 may initiate a training setup 242 to trigger location manager 132 to start learning a pattern of location use by a user. In addition, server manager 122 may initiate a calibration setup 244 to trigger location verification 136 to start tuning criteria 162 and actions 164 for a particular user, to set a threshold for one or more locations and calibrate the sensitivity of location deviations required for triggering an anomaly indicating a potential compromise of a particular mobile device.

Figure 3:
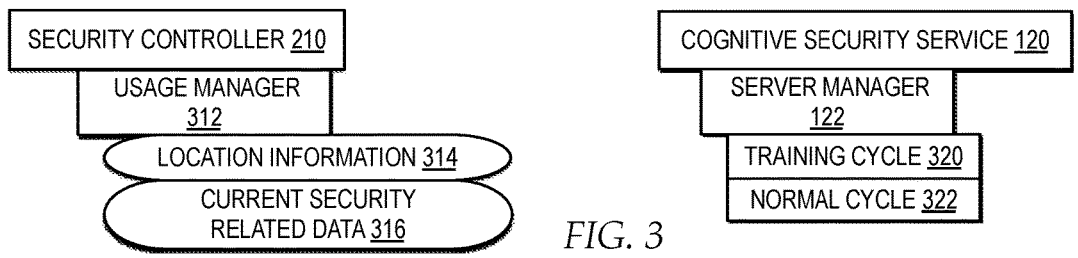
FIG. 3 illustrates a block diagram of one example of a cognitive security service performing a training cycle to establish a baseline location pattern for a user and performing a normal cycle for dynamically assessing baseline and forecasted usage of a mobile device that does not indicate a potential compromise of a mobile device.

FIG. 3 illustrates a block diagram of one example of a cognitive security service performing a training cycle to establish a baseline location pattern for a user and performing a normal cycle for dynamically assessing baseline and forecasted usage of a mobile device that does not indicate a potential compromise of a mobile device.

In one example, in response to completing a setup phase by setup manager 212 illustrated in FIG. 2, security controller 210 may initiate a usage manager 312 to monitor for and automatically broadcast location information 314 and current security related data 316 to cognitive security service 120. In one example, location information 314 may include locations, routes, and other location based information tracked by one or more location tracking features of a mobile device. In one example, current security related data 316 may include updates to security related data 220 tracked in real time from use of a mobile device. In one example, location information 314 and current security related data 316 may include data collected by a mobile device that is relevant to the risk of a potential compromise of a mobile device at a particular location. In one example, usage manager 312 may be set to continually or periodically broadcast location information 314 and current security related data 316 to cognitive security service 120.

In one example, in response to completing a setup phase as illustrated in FIG. 2, server manager 122 may initiate a training cycle 320, which triggers risk monitor 130 and location manager 132 to monitor, filter, store, and analyze location information 314 and current security related data 316 received from security controller 210. In one example, training cycle 320 may trigger risk monitor 130 to filter and analyze location information 314 and current security related data 316 for data indicative of a risk level and a location or area of locations identified with the risk level. In one example, training cycle 320 may trigger location manager 132 to filter, store, analyze, and update location information 314 and current security related data 316 to accumulate locations of a mobile device for a user and analyze the locations to detect baseline, regular location patterns from one or more mobile devices for a user. In one example, location manager 132 continually updates and analyzes the baseline location patterns for a user as each time period progresses and more data is collected from broadcasts of location information 314 and current security related data 316. For example, baseline location patterns identified by location manager 132 may include, but are not limited to, location and application activity patterns that may be typical during a work week, such as regular travel times and routes and regular work hours, location and network access during work hours, and patterns that may be typical on a particular day or during a particular season, such as regular exercise times and locations and regular holiday travel times and locations.

In one example, when server manager 122 initiates training cycle 320, location manager 132 may initially ingest and analyze user routines and usage patterns and location manager 132 may infer or predict behavior, such as the forecasted locations of a user. In one example, one or more types of data ingested and analyzed during training cycle 320 may include, but is not limited to, a user's electronic messages, a user's text messages, one or more calendars, access to third party travel information such as airplane tickets, hotel reservations, meeting locations, other scheduled events, and unstructured text indicating changes in plans. In one example, during training cycle 320, if a mobile device has access to locations of friends or colleagues, such as through an application in which both parties have allowed location monitoring.

In one example, training cycle 320 may initially trigger location manager 132 to generate a baseline of forecasted locations by user for a particular time period as baseline location patterns are detected by location manager 132 and additional security related data for a user is received.

In particular, once an initial corpus of user behavior and locations is detected, location manager 132 may model the user's baseline location patterns through data points, mapping, routing, and other modeling that provides a regular, repetitive activity baseline. Location manager 132 may predict a range of locations at which a user is forecasted to be located at a particular time. Location manager 132 may also detect and predict mapping and routing routines, and, for a particular time, multiple forecasted routes that a user may take. In one example, one or more types of modeling may be implemented for predicting mapping and routing routines based on vectors. In one example, location based vectors may be detected and modeled. In another example, neuro-linguistic based vectors from information security data may be analyzed and modeled.

Once a baseline of forecasted locations by user is established, normal cycle 322 may be triggered in which, as location manager 132 updates baseline location patterns and security related data for a user over time, based on additional broadcasts of location information 314 and current security related data 316, location manager 132 may also periodically analyze the baseline location patterns and security related data to update forecasted locations by user for a particular time period. For example, periodically or continuously, normal cycle 322 may trigger location manager 132 to update the modeling, ranges of locations, and predicted mapping and routines with locations and other data collected from current user behavior that does not trigger verification requirements and current user behavior that a user authenticates if verification requirements are triggered.

Figure 4:
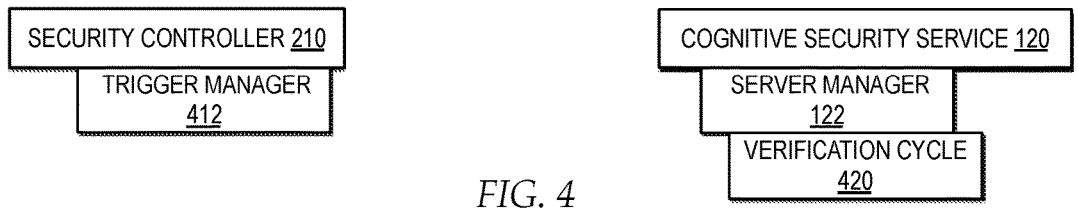
FIG. 4 illustrates a block diagram of one example of a cognitive security service for determining whether current usage of a mobile device is regular or anomalous, indicates a potential compromise of a mobile device and triggering secondary levels of authentication for further access to the mobile device.

FIG. 4 illustrates a block diagram of one example of a cognitive security service for determining whether current usage of a mobile device is regular or anomalous, indicates a potential compromise of a mobile device and triggering secondary levels of authentication for further access to the mobile device.

In one example, as server manager 122 receives broadcasts of location information 314 and current security related data 316 from security controller 210, server manager 122 may initiate a verification cycle 420. In one example, verification cycle 420 may trigger location verification 136 to compare and assess locations and other data from incoming location information 314 and current security related data 316 with forecasted locations and usage for the current time and track whether current locations and usage match the forecasted locations and usage for a time period. In one example, verification cycle 420 may be triggered once training cycle 320 is complete and may function concurrently with normal cycle 322.

In one example, if location verification 136 detects current location and usage outside of the forecasted locations and usage for the current time period, location verification 136 determines whether the deviation of the current location and usage outside the forecasted location and usage is within a threshold level set for the user in criteria 162. In one example, if location verification 136 detects the deviation is below the threshold level, then location verification 136 may mark the location as below the threshold in cumulative locations by user 156 and continue to monitor the current location and usage at proceeding points in time and determines whether the deviation remains below the threshold. In addition, in one example, if location verification 136 detects the deviation is below the threshold level, then location verification 136 may also send an indicator to security controller 210 that no trigger action is required. In one example, a trigger manager 412 of security controller 210 may verify and log indicators from cognitive security service 120 indicating that no trigger action is required.

In one example, if location verification 136 detects the deviation is above the threshold level, then location verification 136 detects an anomaly and sends an indicator that trigger action is required to security controller 210 and may hold the location from being added to cumulative locations by user 156 until user verification is received. In one example, trigger manager 410 may receive indicators that trigger action is required from cognitive security service 120, verify and log the indicators, and determine and manage a response to trigger for each indicator that a trigger action is required according to authentication features 232 and contact information 234. In one example, if trigger manager 410 receives an indicator that trigger action is required from cognitive security service 120, an initial response to all indicators that trigger action is required may include locking down a device from any further access until a secondary level of authentication is performed. A secondary response to an indicator that trigger action is required is to trigger one or more types of secondary levels authentication required to unlock the mobile device, if unlocking the mobile device is permitted. In one example, the secondary level of authentication may include activating a camera on the mobile device for performing facial recognition of any person detectable within the field of view of the camera or activating a microphone on the mobile device for performing voice recognition.

In another example, if trigger manager 412 does not detect any indicator from cognitive security service 120 during an expected period of time specified in thresholds 236, trigger manager 412 may automatically initiate locking down a device from any further access and activating a secondary level of authentication required to unlock the device, such that if a mobile device is compromised and a network connection to the mobile device turned off, the lack of communication from cognitive security service 120 automatically activates trigger manager 412 to lock down the mobile device. In another example, if trigger manager 412 is unable to communicate with cognitive security service 120, trigger manager 412 may trigger a store and forward setting to maintain data in a local repository until a network connection is reestablished with cognitive security service 120, however, if cognitive security service 120 is not reachable after a particular number of attempts set in threshold 236, trigger manager 412 may automatically initiate locking down a device from any further access and activating a secondary level of authentication required to unlock the device. In additional or alternate examples, a user may configure thresholds and types of responses by trigger manager 412 if trigger manager 412 does not receive communications from cognitive security service 120, is not able to send communications to cognitive security service 120, or is not able to establish a communication channel with cognitive security service 120.

Figure 5:
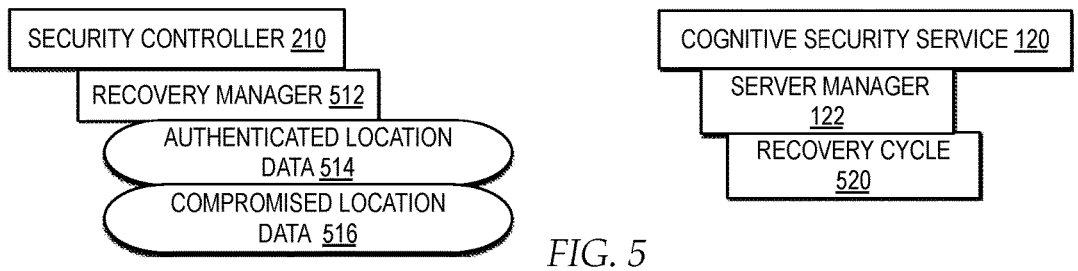
FIG. 5 illustrates a block diagram of one example of a cognitive security service managing recovery options after anomalous usage of a mobile device is detected and a secondary level of authentication is triggered.

FIG. 5 illustrates a block diagram of one example of a cognitive security service managing recovery options after anomalous usage of a mobile device is detected and a secondary level of authentication is triggered.

In one example, once trigger manager 412 initiates locking down a device and activating a secondary level of authentication required to unlock the device, recovery manager 512 of security controller 210 may be triggered to manage recovery from the lock down cycle. In one example, recovery manager 512 may monitor for whether a user enters valid inputs for the triggered secondary level authentication processes to unlock the mobile device.

In one example, if recovery manager 512 detects that the user enters valid inputs for the triggered secondary level authentication processes, recovery manager 512 may log the location and other information as authenticated location data 514 and send authenticated location data 514 to cognitive security service 120. In one example, if recovery manager 512 detects that the user does not enter valid inputs for the triggered secondary level authentication processes, recovery manager 512 may trigger a camera of the mobile device to capture images or video and collect a GPS coordinate and other location identification in compromised location data 516. Recovery manager 512 may send alerts according to contact information 234, such as sending a text alert or email alert with the captured images or video and GPS coordinate and other location identification information. In addition, recovery manager 512 may send compromise location data 516 to cognitive security service 120.

Server manager 122 of cognitive security service 120 may initiate a recovery cycle 520 in response to one or more of sending an indicator that a trigger action is required and receiving a communication from recovery manager 512. In one example, if server manager 122 receives authenticated location data 514 from recovery manager 512, recovery cycle 520 may trigger location manager 132 to update user location database 142 with the location in a baseline location pattern for the user. In one example, by recovery cycle 520 triggering location manager 132 to update user location database 142 with verified new locations, cognitive security service 120 continues to learn expected user locations, which allows for dynamic tuning of forecasted locations for a user based on real-time user feedback through successful authentication.

In one example, if server manager 122 receives compromised location data 516, recovery cycle 520 may trigger risk monitor 130 to update the risk level for the location with data received in compromised location data 516, along with triggering location verification 136 to initiate any additional communications to the communication channels specified in contact information identified in actions 164. In one example, recovery cycle 520 may identify and communicate real-time strategies for response to the detected compromise, to the communication channels, based on analysis of the location data, surrounding environmental data, and any detected end user interactions.

In one example, actions 164 for a user may include a setting that if cognitive security service 120 does not receive location information 314 from a mobile device periodically, during a particular time period or after a last known location in a particular area, verification cycle 420 may automatically initiate an indicator that trigger action is required to be sent to trigger manager 412 and may automatically trigger recovery cycle 520 to actions 164, such as sending communications through communication channels identified for the user.

Figure 6:
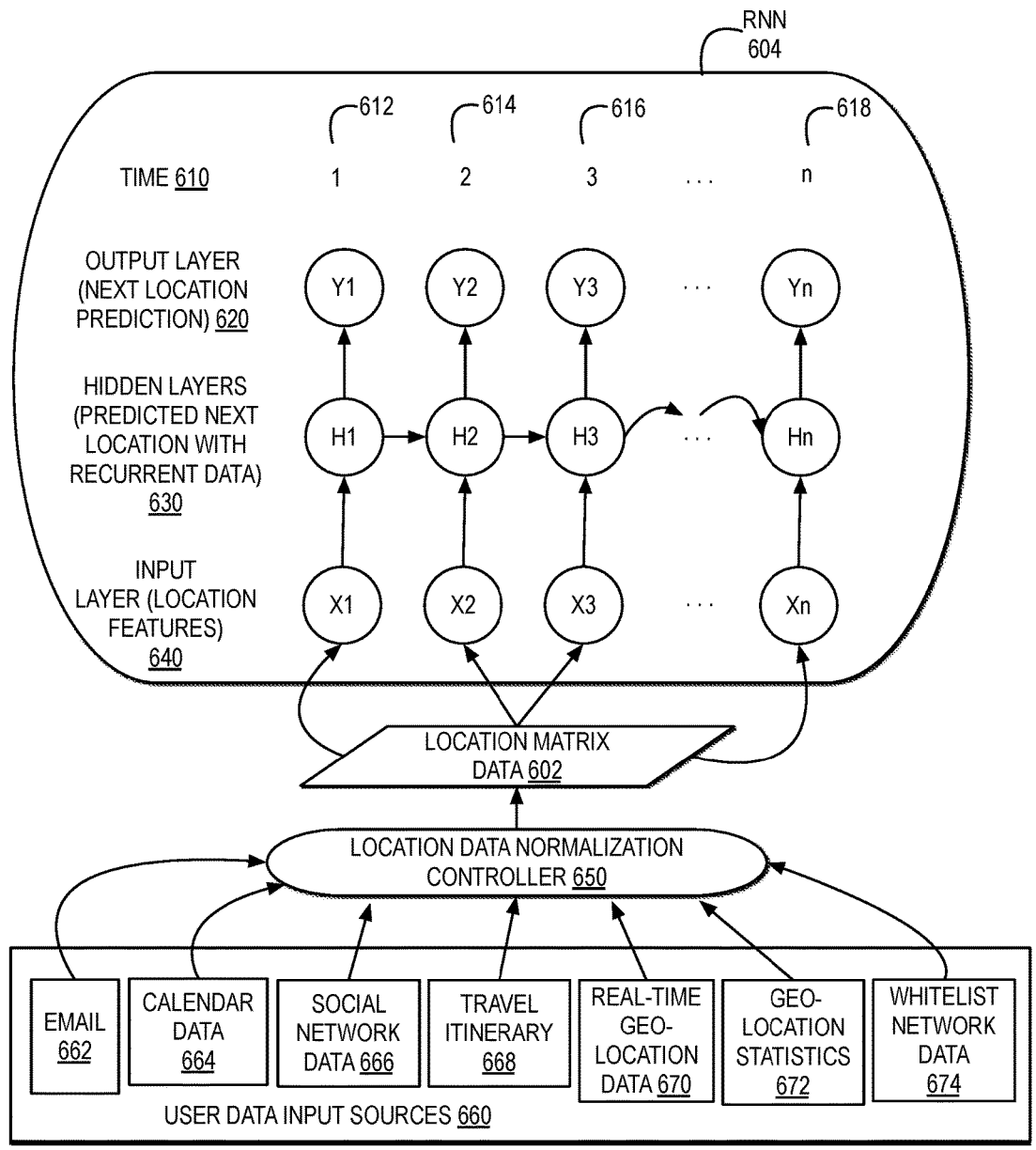
FIG. 6 illustrates a block diagram of one example of location data normalization for detecting baseline location patterns by user and forecasting locations by user.

FIG. 6 illustrates a block diagram of one example of location data normalization for detecting baseline location patterns by user and forecasting locations by user.

In one example, during training cycle 320, server manager 122 may ingest location related data for a user from multiple sources, evaluate the location related data, learn user location and movement patterns, and forecast future location patterns. In one example, location manager 132 may implement a location data normalization controller 650 to generate normalized, multi-dimensional, time-based location matrix data 602 from multiple user data input sources 660 through the use of semi-supervised machine learning models, such as polynomial regression models, to generate time-based location matrix data 602 from both labeled data and unlabeled data. In one example, user data input sources 660 may include one or more data sources and services, including, but not limited to, email 662, calendar data 664, social network data 666, travel itinerary 668, real-time geo-location data 670 reported by one or more mobile devices, geo-location statistics 672, and whitelist network data 674. Examples of labeled data may include data with known location data such as, but not limited to, known GPS location data in travel itinerary 668 and known and authorized networks within whitelist network data 674. Examples of unlabeled data may include data not yet associated with a known location such as, but not limited to, newly encountered data from any of user data input sources 660, unrecognized GPS location data in travel itinerary 668, or previously unseen or unauthorized networks not identified in whitelist network data 674.

In one example, location data normalization controller 650 may output location matrix data 602 with data organized by location classifications and time-based location. In one example, a recurrent neural network (RNN) 604 may receive location matrix data 602 as inputs, to be used by location manager 132 to predict a next device location for a next step in time. In one example, RNN 604 may implement one or more types of cognitive modeling. In one example, RNN 604 may refer to a class of artificial neural networks that may use an internal memory to process arbitrary sequences of inputs, including labeled and unlabeled data, using connections between sequential units of time.

In one example, RNN 604 may be incorporated into cognitive security service 120 to forecast future device locations through trend analysis over captured time-sequenced data and enable cognitive security service 120 to detect anomalies in user location, movement, and environment, against forecasted, normalized behavior patterns. Use of RNN 604 may facilitate nonlinear relationship modeling of time-sequenced data by leveraging previously analyzed baseline feature data when processing current features at a given point in time. In one example, location matrix data 602 may be stored in user locations database 142 or accessible to location manager 132 in an additional or alternate data structure. In one example, RNN 604 may be stored in forecasted locations database 144 or accessible to location manager 132 in an additional or alternate data structure.

In one example, RNN 604 may include multiple layers, such as an input layer 640, one or more hidden layers, such as hidden layer 630, and an output layer 620. RNN 604 is illustrated with one or more columns of data, each marked by a time 610, in sequence. For example, RNN 604 may include N columns, illustrated by a first column 612, marked by a time "1", a second column 614, marked by a next sequential time period of "2", a third column 616, marked by a next sequential time period of "3", and an nth column 618, marked by a sequential time period of "n".

In one example, input layer 640 of RNN may filter relevant location features extracted from ingested data from location matrix data 602 at each time step T, to serve as input to into hidden layers 630 at each time step T. For example, input layer 640 illustrates location features X1 input from location matrix data 602 at time "1", location features X2 input from location matrix data 602 at time "2", location features X3 input from location matrix data 602 at time "3", and location features Xn input from location matrix data 602 at time "n".

In one example, hidden layers 630 may implement a nonlinear activation function to analyze device location feature input from input layer 640 at time step T, along with cached device location output data from time step T−1, and transfer the calculated trend data into output probabilities for the subsequent forecasted location of the device. In one example, the nonlinear activation function implemented by hidden layers 630 may utilize weights and biases learned and tuned as RNN 604 is trained. For example, hidden layers 630 illustrates predicted next locations with current data H1 at time "1", predicted next locations with current data H2 at time "2", predicted next locations with current data H3 at time "3", and predicted next locations with current data Hn at time "n".

In one example, output layer 620 illustrates a next location prediction, where the next location prediction at each time step T may include multiple locations, each weighted with a separate probability. In one example, during normal cycle 322, a highest probability of next location prediction at each time step T may represent a forecasted location, which may be compared against a current location, to determine whether an anomaly is present.

While in the example, RNN 604 illustrates one example of modeling locations, probabilities, and weights and biases, to predict a next location at each time step, in additional or alternate embodiments, RNN 604 may include additional or alternate layers, types of data, and ranges of data. In addition, while in the example, RNN 604 illustrates one example of modeling locations, probabilities, and weights and biases, to predict a next location at each time step, in additional or alternate embodiments, RNN 604 may integrate one or more additional types of learning techniques for improving the mathematical modeling of predicted maps and routines for periods of time with higher degrees of uncertainty, such as, for example, fuzzy neural systems modeled with grey weighted digraphs.

Figure 7:
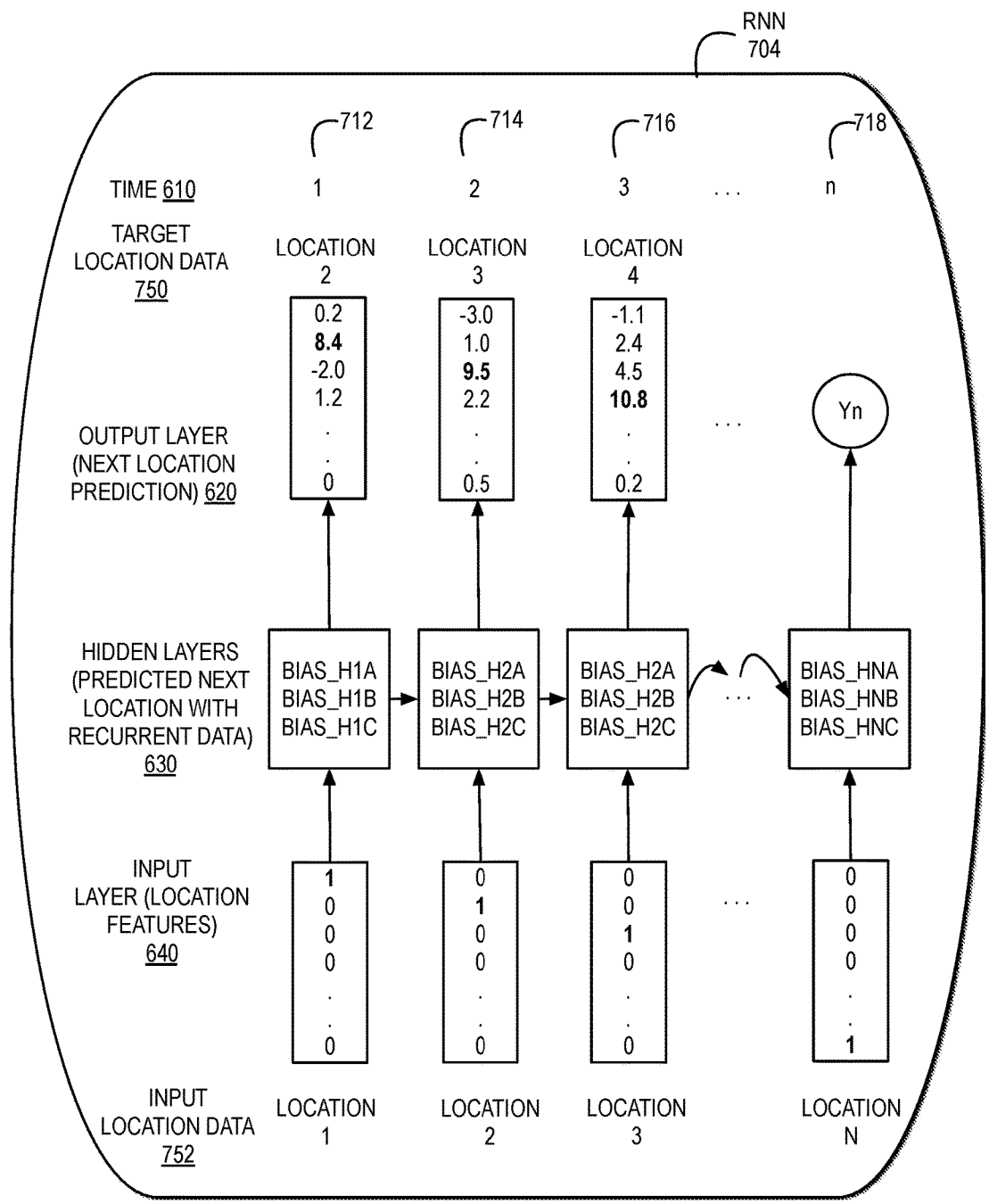
FIG. 7 illustrates a block diagram of one example of training a recurrent neural network to forecast a next device location.

FIG. 7 illustrates a block diagram of one example of training an RNN to forecast a next device location.

In one example, RNN 704 is illustrated during a training cycle, illustrating a probability distribution of a forecasted next device location in a time sequence, given a sequence of previous device location data. In one example, FIG. 7 illustrates a process for training RNN 704 on a sequence of a device moving a "location 1" to a "location N" as indicated by input location data 752 over time steps of time 610 from "1" to "n", as illustrated by a first column 712 at time "1", a second column 714 at time "2", a third column 716 at time "3", and a nth column 718 at time "n".

In the example, for purpose of illustration of evaluating RNN 704 from a location dimension perspective, each input location in input layer 640 is illustrated encoded into a single column of a multi-dimensional vector, where the "1" in the vector indexes into the unique location data dimension with location matrix data 602 for the location and time. In the example, the data for each sequenced location from location matrix data 602 is fed into RNN 704 at a time T, to generate output vectors in output layer 620 with the probabilities for each device location coming next in the sequence indicated by a position in the vector associated with each location.

In the example, at time "1", output layer 620 includes a confidence level of "0.02" of the next location being "location 1" at position 1 in the output vector, a confidence level of "8.4" of the next location being "location 2" at position 2 in the output vector, a confidence level of "−2.0" of the next location being "location 3" at position 3 in the output vector, a confidence level of "1.2" of the next location being "location 4" at position 4 in the output vector, and a confidence level of "0" of the next location being "location N" at position N" in the output vector. Therefore, the forecast location at time "1" is "location 2" as indicated by the highest level of confidence in the output layer at time "1" of "8.4".

In the example, at time "2", RNN 704 recurrently processes current input data by also integrating the previous location output data from time "1" for inferring trend direction and calculating probability distributions. As illustrated, at time "2" output layer 620 includes a confidence level of "−3.0" of the next location being "location 1" at position 1 in the output vector, a confidence level of "1.0" of the next location being "location 2" at position 2 in the output vector, a confidence level of "9.5" of the next location being "location 3" at position 3 in the output vector, a confidence level of "2.2" of the next location being "location 4" at position 4 in the output vector, and a confidence level of "0.5" of the next location being "location N" at position N" in the output vector. Therefore, the forecast location at time "2" is "location 3" as indicated by the highest level of confidence in the output layer at time "2" of "9.5".

In the example, at time "3", RNN 704 recurrently processes current input data by also integrating the previous location output data from time "2" for inferring trend direction and calculating probability distributions. As illustrated, at time "3" output layer 620 includes a confidence level of "−1.1" of the next location being "location 1" at position 1 in the output vector, a confidence level of "2.4" of the next location being "location 2" at position 2 in the output vector, a confidence level of "4.5" of the next location being "location 3" at position 3 in the output vector, a confidence level of "10.8" of the next location being "location 4" at position 4 in the output vector, and a confidence level of "0.2" of the next location being "location N" at position N" in the output vector. Therefore, the forecast location at time "3" is "location 4" as indicated by the highest level of confidence in the output layer at time "3" of "10.8".

In the example, the weights and biases at each time step T in hidden layers 630 may be adjusted and tuned during the training cycle 320, including a training phase of RNN 704, to optimize the probability distributions in output layer 620 and establish baseline models for a device location path over time. For example, in hidden layers 630, at time "1", the weights and biases applied are "bias_H1A", "bias_H1B", and "bias_H1C", at time "2", the weights and biases applied are "bias_H2A", "bias_H2B", and "bias_H2C", at time "3", the weights and biases applied are "bias_H3A", "bias_H3B", and "bias_H3C", and at time "N", the weights and biases applied are "bias_HNA", "bias_HNB", and "bias_HNC".

In one example, location manager 132, in response to receiving a current location at a time T, may compare the current location with the forecast location in RNN 704 of the highest probability location at that time. In one example, location manager 132 may detect the amount of deviation of the current location from the baseline model for the highest probability location, compare the deviation against acceptable thresholds in criteria 162, and trigger one or more actions specified in actions 164 if the deviation exceeds acceptable thresholds.

Figure 8:
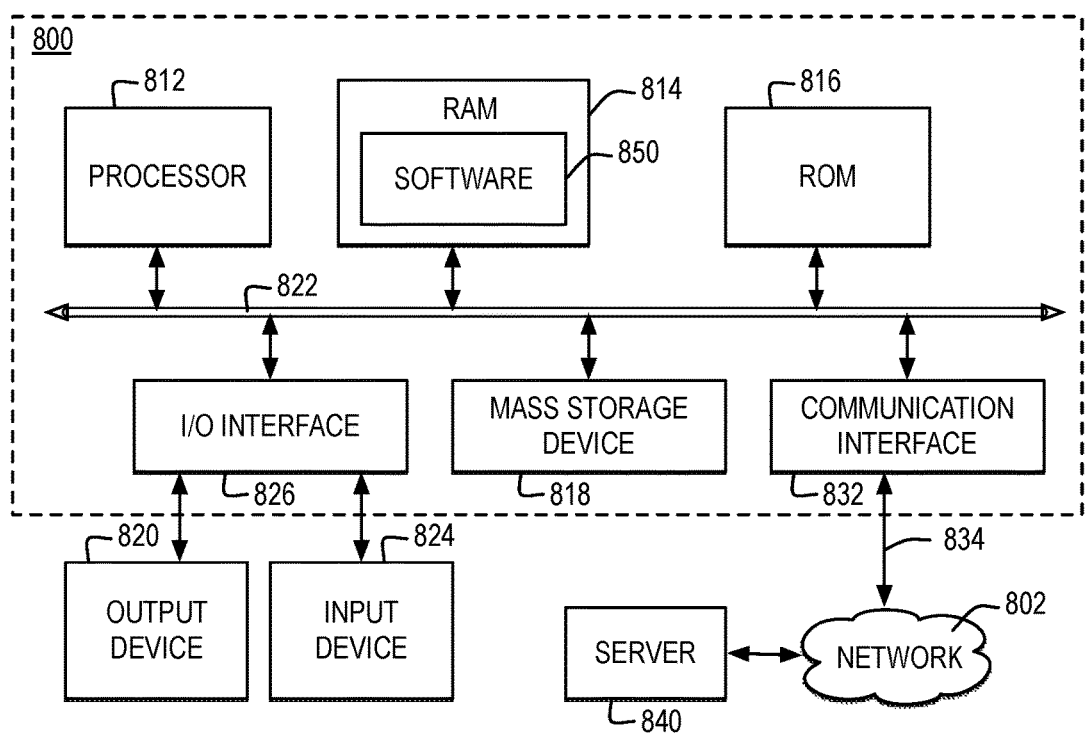
FIG. 8 illustrates a block diagram of one example of a computer system in which one embodiment of the invention may be implemented.

FIG. 8 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to a network, such as network 802.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power.

Processor 812 may be at least one general-purpose processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Computer system 800 may communicate with a remote computer, such as server 840, or a remote client. In one example, server 840 may be connected to computer system 800 through any type of network, such as network 802, through a communication interface, such as communication interface 832, or over a network link that may be connected, for example, to network 802.

In the example, multiple systems within a network environment may be communicatively connected via network 802, which is the medium used to provide communications links between various devices and computer systems communicatively connected. Network 802 may include permanent connections such as wire or fiber optics cables and temporary connections made through telephone connections and wireless transmission connections, for example, and may include routers, switches, gateways and other hardware to enable a communication channel between the systems connected via network 802. Network 802 may represent one or more of packet-switching based networks, telephony based networks, broadcast television networks, local area and wide area networks, public networks, and restricted networks.

Network 802 and the systems communicatively connected to computer 800 via network 802 may implement one or more layers of one or more types of network protocol stacks which may include one or more of a physical layer, a link layer, a network layer, a transport layer, a presentation layer, and an application layer. For example, network 802 may implement one or more of the Transmission Control Protocol/Internet Protocol (TCP/IP) protocol stack or an Open Systems Interconnection (OSI) protocol stack. In addition, for example, network 802 may represent the worldwide collection of networks and gateways that use the TCP/IP suite of protocols to communicate with one another. Network 802 may implement a secure HTTP protocol layer or other security protocol for securing communications between systems.

In the example, a communication interface 832 includes an adapter 834 for connecting computer system 800 to network 802 through a link and for communicatively connecting computer system 800 to server 840 or other computing systems via network 802. Although not depicted, communication interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

In one embodiment, the operations performed by processor 812 may control the operations of flowchart of FIGS. 9-16 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts in FIGS. 9-16.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 8, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a, wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

Figure 9:
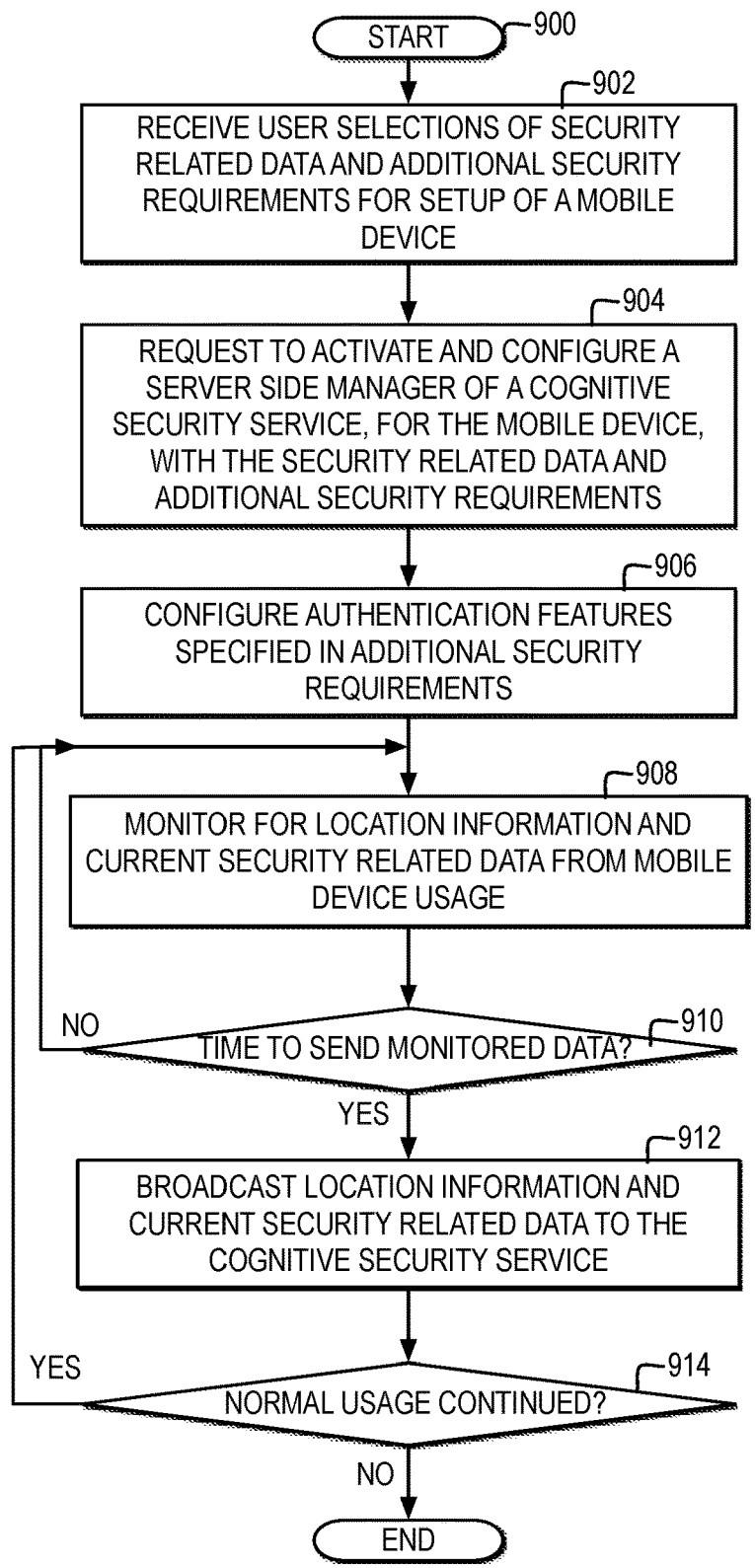
FIG. 9 illustrates a high-level logic flowchart of one example of a process and computer program for setting up a mobile device with a cognitive security service for preventing data breaches on mobile devices through real-time, location aware data security.

FIG. 9 illustrates a high-level logic flowchart of one example of a process and computer program for setting up a mobile device with a cognitive security service for preventing data breaches on mobile devices through real-time, location aware data security.

In one example, the process and computer program starts at block 900 and thereafter proceeds to block 902. Block 902 illustrates receiving user selections of security related data and additional security requirements for setup of a mobile device, including authorization to access the security related data and additional security requirements through other services. Next, block 904 illustrates requesting to activate and configure a server side manager of a cognitive security service, for the mobile device, with the security related data and additional security requirements. Thereafter, block 906 illustrates configuring authentication features at the mobile device that are specified in the additional security requirements. Next, block 908 illustrates monitoring for location information and current security related data from mobile device usage. Thereafter, block 910 illustrates a determination whether it is time to send monitored data to the cognitive security service. In one example, a user may specify a frequency at which to send monitored data and may specify one or more factors for selecting the frequency and may specify trigger events for sending monitored data. At block 910, if it is not time to send monitored data, then the process returns to block 908. At block 910, if it is time to send monitored data, the process passes to block 912.

Block 912 illustrates broadcasting the location information and current security related data to the cognitive security service. Next, block 914 illustrates a determination whether normal usage continues. At block 914, if normal usage continues, then the process returns to block 908. At block 914, if normal usage does not continue, then the process ends.

Figure 10:
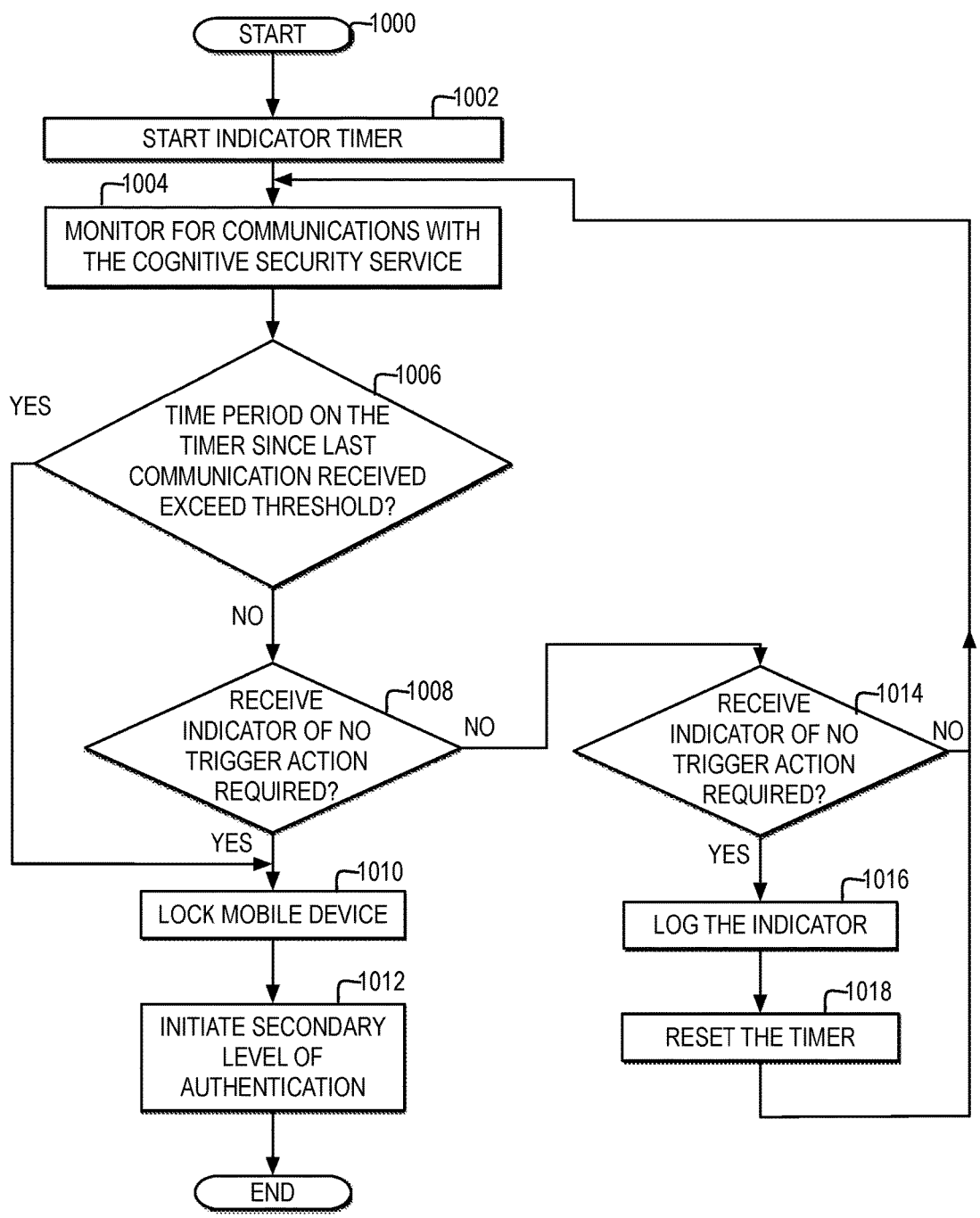
FIG. 10 illustrates a high-level logic flowchart of one example of a process and computer program for determining when to initiate secondary levels of authentication at a mobile device for preventing data breaches on mobile devices through real-time, location aware data security.

FIG. 10 illustrates a high-level logic flowchart of one example of a process and computer program for determining when to initiate secondary levels of authentication at a mobile device for preventing data breaches on mobile devices through real-time, location aware data security.

In one example, the process and program starts at block 1000 and thereafter proceeds to block 1002. Block 1002 illustrates starting an indicator timer. Next, block 1004 illustrates monitoring for communications with the cognitive security service. Thereafter, block 1006 illustrates a determination whether the time period on the timer since a last communication was received has exceeded a threshold. At block 1006, if the time period on the timer since a last communication was received does not exceed the threshold, then the process passes to block 1008. Block 1008 illustrates a determination whether an indicator of no trigger action required is received. At block 1008, if an indicator of no trigger action required is received, then the process passes to block 1010. Returning to block 1006, if the time period on the timer since a last communication was received exceeds the threshold, then the process passes to block 1010. Block 1010 illustrates locking the mobile device. Next, block 1012 illustrates initiating a secondary level of authentication, and the process ends.

Returning to block 1008, at block 1008, if an indicator of no trigger action required is not received, then the process passes to block 1014. Block 1014 illustrates a determination whether an indicator of no trigger action required is received. At block 1016, if a no trigger action required indicator has not been received, then the process returns to block 1004. At block 1016, if an indicator of no trigger action required is received, then the process passes to block 1016. Block 1016 illustrates logging the indicator. Next, block 1018 illustrates resetting the timer, and the process returns to block 1004.

Figure 11:
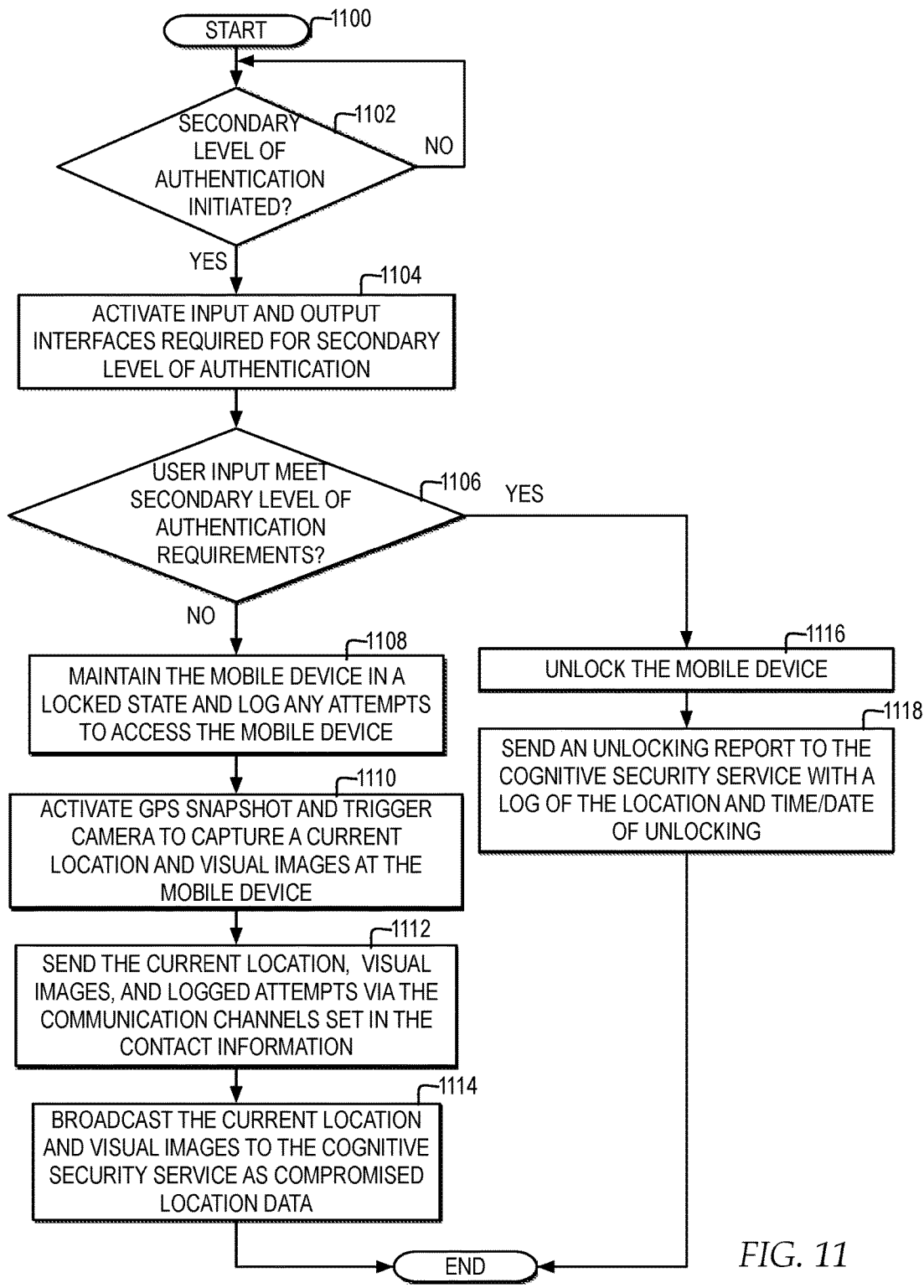
FIG. 11 illustrates a high-level logic flowchart of one example of a process and computer program for managing secondary levels of authentication at a mobile device for preventing data breaches on mobile devices through real-time, location aware data security.

FIG. 11 illustrates a high-level logic flowchart of one example of a process and computer program for managing secondary levels of authentication at a mobile device for preventing data breaches on mobile devices through real-time, location aware data security.

In one example, the process and program starts at block 1100 and thereafter proceeds to block 1102. Block 1102 illustrates a determination whether a secondary level of authentication is initiated. If a secondary level of authentication is initiated, then the process passes to block 1104. Block 1104 illustrates activating input and output interfaces required for secondary levels of authentication. Next, block 1106 illustrates a determination whether a user input to one or more input interfaces meets secondary level of authentication requirements. At block 1106, if the user input does not meet secondary level of authentication requirements, then the process passes to block 1108. Block 1108 illustrates maintaining the mobile device in a locked state and logging any attempts to access the mobile device. Next, block 1110 illustrates activating a GPS snapshot and triggering a camera to capture a current location and visual images. Thereafter, block 1112 illustrates sending the current location, visual images, and logged attempts via the communication channels set in the contact information. Next, block 1114 illustrates broadcasting the current location and visual images to the cognitive security service as compromised location data, and the process ends.

Returning to block 1106, at block 1106 if the user input does meet secondary level of authentication requirements, then the process passes to block 1116. Block 1116 illustrates unlocking the mobile device. Next, block 1118 illustrates sending an unlocking report with a log of the location and time/date of unlocking to the cognitive security service, and the process ends.

Figure 12:
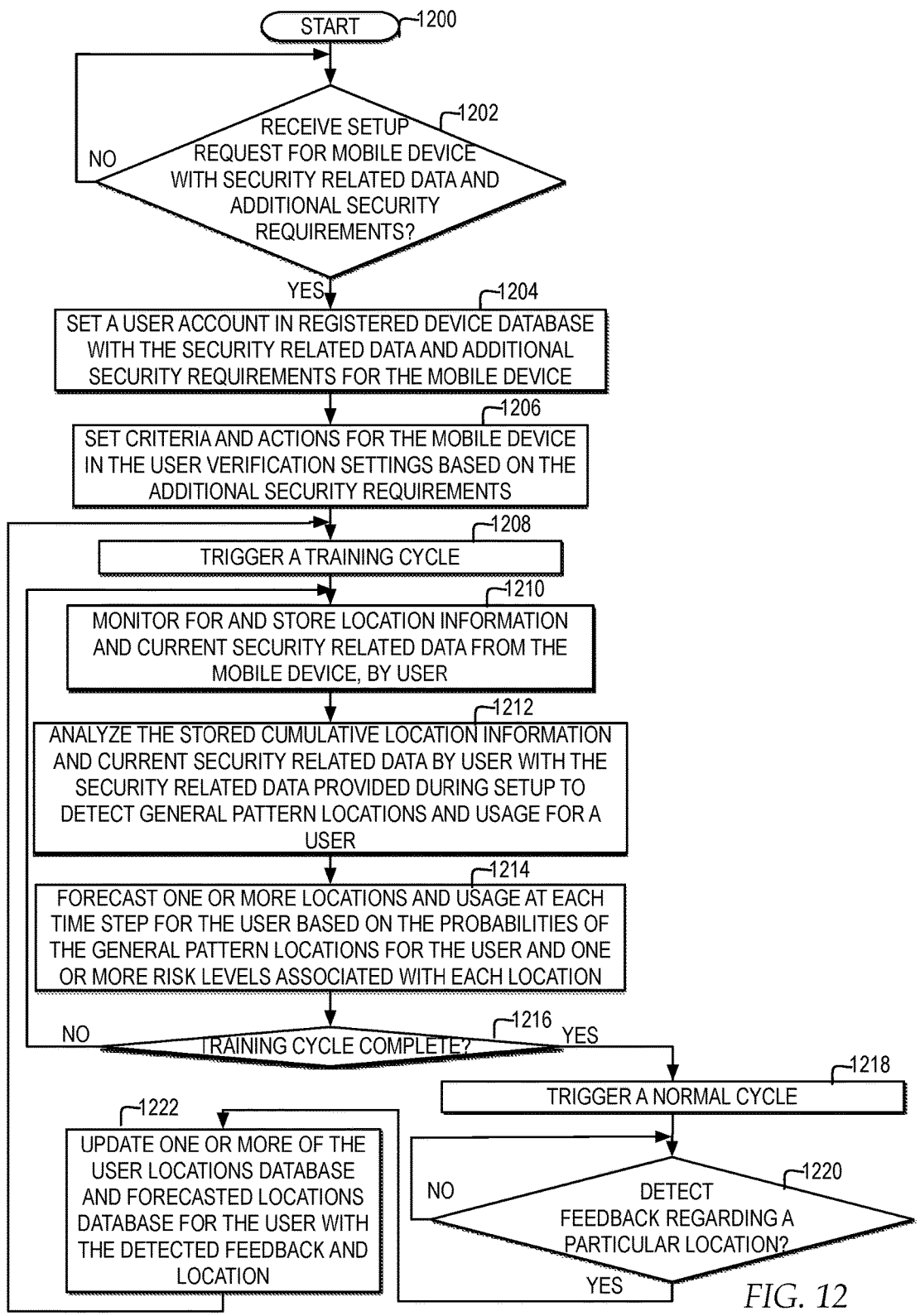
FIG. 12 illustrates a high-level logic flowchart of one example of a process and computer program for setting up and training a cognitive security service to monitor multiple mobile devices and aggregate location and other security related data for preventing data breaches on mobile devices through real-time, location aware data security.

FIG. 12 illustrates a high-level logic flowchart of one example of a process and computer program for setting up and training a cognitive security service to monitor multiple mobile devices and aggregate location and other security related data for preventing data breaches on mobile devices through real-time, location aware data security.

In one example, the process and program starts at block 1200 and thereafter proceeds to block 1202. Block 1202 illustrates a determination whether a setup request for a mobile device is received with security related data and additional security requirements. At block 1202, if a setup request for a mobile device is received with security related data and additional security requirements, the process passes to block 1204. Block 1204 illustrates setting a user account in registered device database with the security related data and additional security requirements for the mobile device. Next, block 1206 illustrates setting criteria and actions for the mobile device in the user verification settings based on the additional security requirements. Thereafter, block 1208 illustrates triggering a training cycle. Next, block 1210 illustrates monitoring for and storing location information and current security related data from the mobile device by user. Thereafter, block 1212 illustrates analyzing the stored cumulative location information and current security related data by user with the security related data provided during setup to detect general pattern locations and usage for a user. Thereafter, block 1214 illustrates forecasting one or more locations and usage at each time step for mobile devices by user based on the probabilities of the general pattern locations for the user and one or more risk levels associated with each location, and the process passes to block 1216.

Block 1216 illustrates a determination whether a training cycle is complete. At block 1216, if a training cycle is not complete, then the process returns to block 1210 and continues to learn general patterns by user and update forecasted locations by user. At block 1216, if a training cycle is complete, then the process passes to block 1218. Block 1218 illustrates triggering a normal cycle. Next, block 1220 illustrates a determination whether feedback regarding a particular location is received. At block 1220, if feedback regarding a particular location is received, then the process passes to block 1222. Block 1222 illustrates updating one or more of the user locations database and forecast locations database for the user with the detected feedback and location, and the process returns to block 1208.

Figure 13:
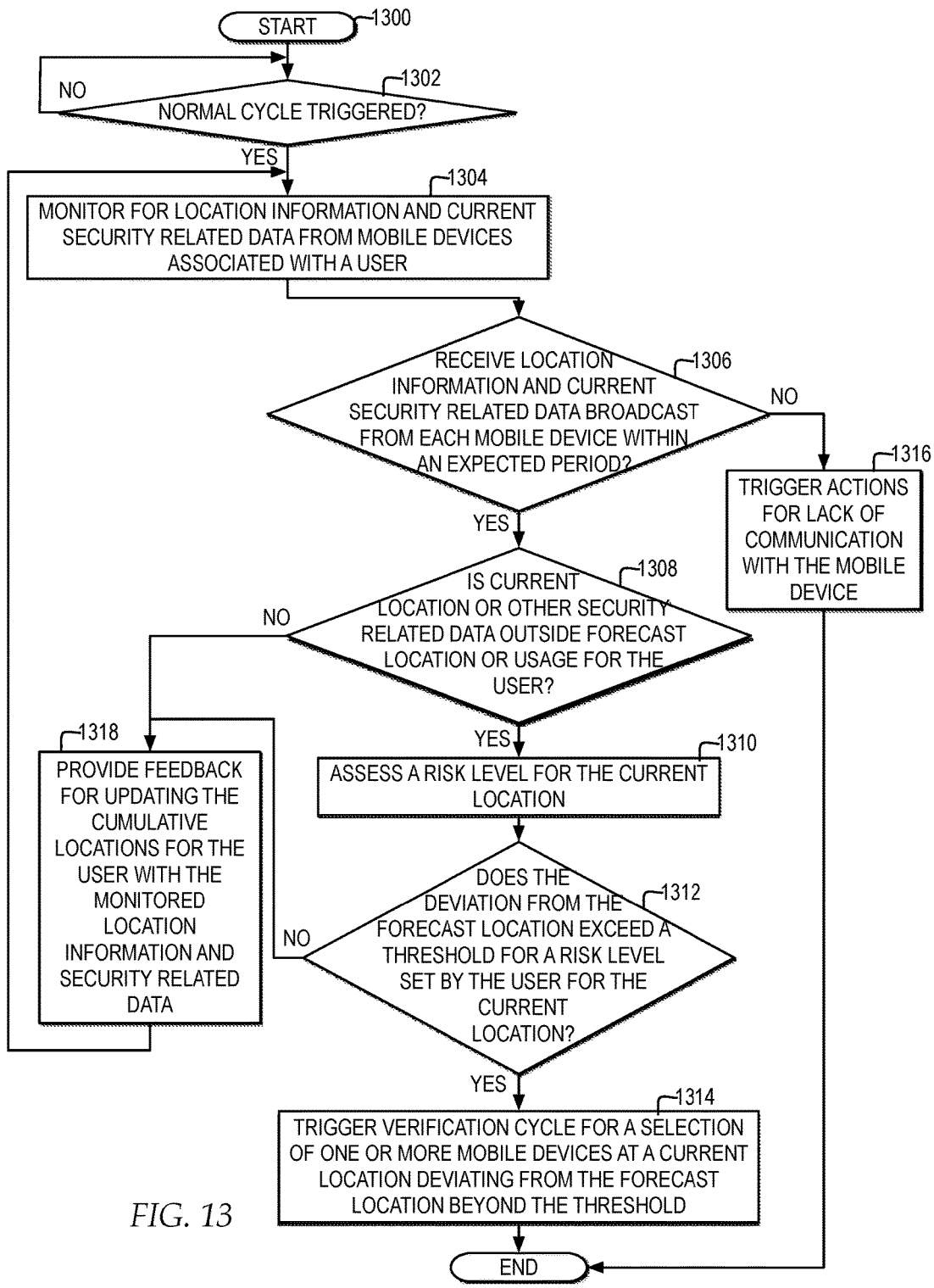
FIG. 13 illustrates a high level logic flowchart of one example of a process and computer program for operating a cognitive security service in a normal mode to monitor location and other security related data reported by multiple mobile devices and determine whether the location and other security related data deviates from forecasted locations and usage patterns for each time step, to prevent data breaches on mobile devices through real-time, location aware data security.

FIG. 13 illustrates a high level logic flowchart of one example of a process and computer program for operating a cognitive security service in a normal mode to monitor location and other security related data reported by multiple mobile devices and determine whether the location and other security related data deviates from forecasted locations and usage patterns for each time step, to prevent data breaches on mobile devices through real-time, location aware data security.

In one example, the process and program starts at block 1300 and thereafter proceeds to block 1302. Block 1302 illustrates a determination whether a normal cycle is triggered. At block 1302, if a normal cycle is triggered, then the process passes to block 1304. Block 1304 illustrates monitoring for location information and current security related data from multiple mobile devices associated with a user. Next, block 1306 illustrates a determination whether location information and current security related data broadcasts are received from each mobile device within an expected period. At block 1306, if location information and current security related data broadcasts are not received from each mobile device within an expected period, then the process passes to block 1316. Block 1316 illustrates triggering actions for lack of communication with the mobile device, and the process ends.

Returning to block 1306, if location information and current security related data broadcasts are received from each mobile device within an expected period, then the process passes to block 1308. Block 1308 illustrates a determination whether the current location or other security related data is outside the forecast location or usage for the user. At block 1308, if the current location or other security related data is not outside the forecast location or usage for the user, then the process passes to block 1318. Block 1318 illustrates providing feedback for updating the cumulative locations for the user with the monitored location information and security related data, and the process returns to block 1304.

Returning to block 1308, at block 1308, if the current location or other security related data is outside the forecast location or usage for the user, then the process passes to block 1310. Block 1310 illustrates assessing a risk level for the current location. Next, block 1312 illustrates a determination whether the deviation from the forecast location exceeds a threshold for a risk level set by the user for the current location. At block 1312, if the deviation from the forecast location does not exceed a threshold for a risk level set by the user for the current location, then the process passes to block 1318. At block 1312, if the deviation from the forecast location does exceed a threshold for a risk level set by the user for the current location, then the process passes to block 1314. Block 1314 illustrates triggering a verification cycle for a selection of one or more mobile devices for the user that are currently at the location that deviates from the forecast location beyond the threshold, and the process ends.

Figure 14:
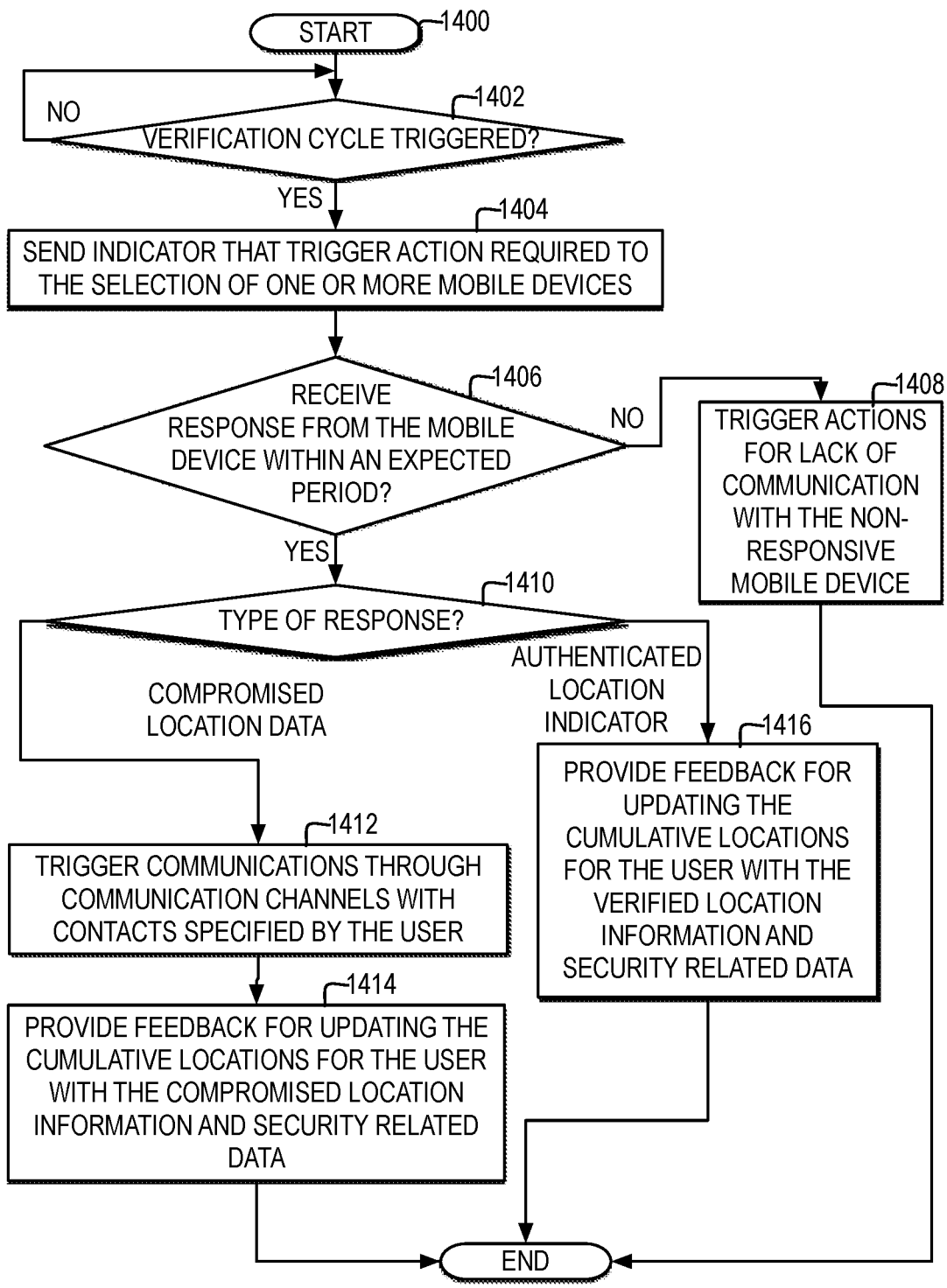
FIG. 14 illustrates a high-level logic flowchart of one example of a process and computer program for operating a cognitive security service in a verification mode to manage verification requirements for a mobile device when the device is detected as compromised, to prevent data breaches on mobile devices through real-time, location aware data security.

FIG. 14 illustrates a high-level logic flowchart of one example of a process and computer program for operating a cognitive security service in a verification mode to manage verification requirements for a mobile device when the device is detected as compromised, to prevent data breaches on mobile devices through real-time, location aware data security.

In one example, the process and program start at block 1400 and thereafter proceed to block 1402. Block 1402 illustrates a determination whether a verification cycle is triggered. At block 1402, if a verification cycle is triggered, then the process passes to block 1404. Block 1404 illustrates sending an indicator that trigger action is required to the one or more mobile devices the verification cycle is triggered for. Block 1406 illustrates a determination whether a response is received from each of the selection of one or more mobile devices within an expected period. At block 1406, if a response is not received from one or more of the selection of one or more mobile devices within an expected period, then the process passes to block 1408 as to the one or more non-responsive mobile devices. Block 1408 illustrates triggering actions for lack of communication with the non-responsive mobile device, and the process ends.

Returning to block 1406, at block 1406, if a response is received from one or more of the selection of one or more mobile devices within an expected period, then the process passes to block 1410. Block 1410 illustrates a determination as to the type of response received for the responsive mobile devices. At block 1410, if the type of response is an authentication location indicator from the security controller of a mobile device, then the process passes to block 1416. Block 1416 illustrates providing feedback for updating the cumulative locations for the user with the verified location information and security related data, and the process ends.

Returning to block 1410, at block 1410, if the type of response is compromised location data from the security controller of a mobile device, then the process passes to block 1412. Block 1412 illustrates triggering communications through communication channels with contacts specified by the user. Next, block 1414 illustrates providing feedback for updating the cumulative locations for the user with the compromised location information and security related data, and the process ends.

Figure 15:
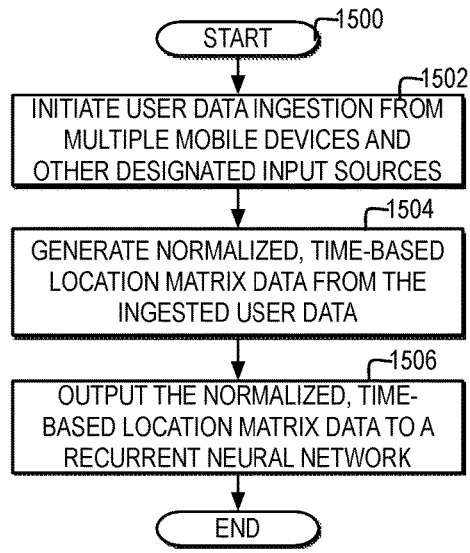
FIG. 15 illustrates a high-level logic flowchart of a process and program for a location data normalization controller generating a normalized, multi-dimensional, time-based location matrix data from multiple user data input sources with both labeled and unlabeled data through the use of semi-supervised machine learning models.

FIG. 15 illustrates a high-level logic flowchart of a process and program for a location data normalization controller generating a normalized, multi-dimensional, time-based location matrix data from multiple user data input sources with both labeled and unlabeled data through the use of semi-supervised machine learning models.

In one example, the process and program starts at block 1500 and thereafter proceeds to block 1502. Block 1502 illustrates initiating user data ingestion from multiple mobile devices and other designated input sources for a user, including both labeled and unlabeled. Next, block 1504 illustrates generating normalized, time-based location matrix data from the ingested user data, based on sequential time steps. Thereafter, block 1506 illustrates outputting the normalized, time-based location matrix data to a recurrent neural network, and the process ends.

Figure 16:
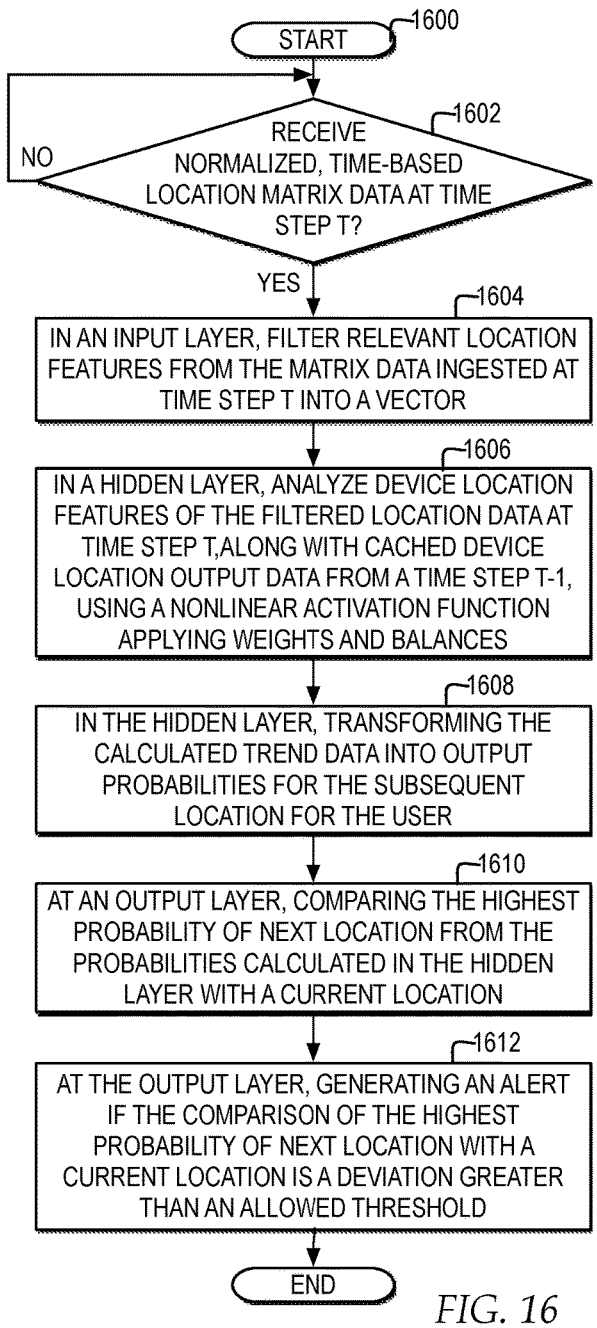
FIG. 16 illustrates a high-level logic flowchart of a process and program for a recurrent neural network analyzing normalized, multi-dimensional, time-based location matrix data and forecasting a high probability of next location for each sequential time step.

FIG. 16 illustrates a high-level logic flowchart of a process and program for a recurrent neural network analyzing normalized, multi-dimensional, time-based location matrix data and forecasting a high probability of next location for each sequential time step.

In one example, the process and program starts at block 1600 and thereafter proceeds to block 1602. Block 1602 illustrates a determination whether a recurrent neural network receives normalized, time-based location matrix data at time step T. At block 1602 if a recurrent neural network receives normalized, time-based location matrix data at time step T, then the process passes to block 1604. Block 1604 illustrates, in an input layer, filtering relevant location features from the matrix data ingested at time step T into a vector. Next, block 1606 illustrates, in one or more hidden layers, analyzing the device location features of the filtered location data at time step T, along which cached device location output from a time step T−1, using a nonlinear activation function applying weights and balances for the time step. Next, block 1608 illustrates, in the one or more hidden layers, transforming the calculated trend data into output probabilities for the subsequent location for the user. Thereafter block 1610 illustrates, at an output layer, comparing the highest probability of next location from the probabilities calculated in the hidden layer with a current location. Next, block 1612 illustrates, at the output layer, generating an alert if the comparison of the highest probability of next location with the current location is a deviation greater than an allowed threshold, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
   learning, by a computer system, a plurality of regular locations and usage of one or more mobile devices for a user at a plurality of times based on aggregated location and usage information reported by the one or more mobile devices via a network;
   forecasting, by the computer system, one or more selected locations and selected usage by the user with a highest probability of predictability at each of a plurality of future sequential times from among the plurality of regular locations and usage; and
   responsive to detecting a current location of the one or more mobile devices for the user deviates from the one or more selected locations and selected usage beyond a threshold specified by the user, triggering, by the computer system, via the network, one or more secondary levels of authentication at the one or more mobile devices, wherein the one or more secondary levels of authentication prevent data breaches on the one or more mobile devices through real-time, location aware data security.

2. The method according to claim 1, further comprising:
   assessing, by the computer system, a risk level at each of the one or more particular locations based on aggregated risk data received for each of the particular locations via the network from a plurality of location related services that monitors risk related factors, the plurality of location related services comprising the one or more mobile devices and one or more publicly available services providing security related reports; and
   selecting, by the computer system, the threshold specified by the user according to the risk level for the current location from among a plurality of thresholds each specified for a separate risk level from among a plurality of risk levels.

3. The method according to claim 1, wherein learning, by a computer system, a plurality of regular locations and usage of one or more mobile devices for a user at a plurality of times based on aggregated location and usage information reported by the one or more mobile devices via a network further comprises:
   ingesting, by the computer system, at the plurality of times, the aggregated location and usage information reported by the one or more mobile devices for the user and from one or more additional security related data services specified by the user, the one or more additional user data input sources comprising one or more of an electronic mail service, an electronic calendar service, a social network service, a travel itinerary, one or more location based statistics, and a network whitelist of one or more known networks;
   generating, by the computer system, a normalized time-based location matrix from the ingested plurality of locations and usage at the plurality of times; and
   outputting, by the computer system, the normalized time-based location matrix to a recurrent neural network.

4. The method according to claim 1, wherein forecasting, by the computer system, one or more selected locations and selected usage by the user with a highest probability of predictability at each of a plurality of future sequential times from among the plurality of regular locations and usage further comprises:

responsive to receiving the plurality of regular locations and usage for the user at a plurality of times in a matrix, filtering, by the computer system, one or more relevant location features from the matrix for a first time step into a vector within a recurrent neural network;

analyzing, by the computer system, one or more device location features in the vector at the first time step within the recurrent neural network by applying a nonlinear activation function one or more weights and balances for the first time step along with previously cached location output data from a previous time step, the previous time step at least one sequential time step prior to the first time step;

transforming, by the computer system, the analyzed device location features in the vector into a plurality of ordered according to probability in the vector within the recurrent neural network; and forecasting, by the computer system, a selected entry in the vector ordered with the highest probability of predictability at the first time step within the recurrent neural network.

5. The method according to claim 1, further comprising:

receiving, by the computer system, a request to setup a particular mobile device of the one or more mobile devices with security related data and one or more additional security requirements for the user;

setting, by the computer system, an identifier for the particular mobile device in an account for the user;

adding, by the computer system, the threshold, contact information; and one or more actions specified by the additional security requirements to the account for the user for the particular mobile device;

aggregating, by the computer system, the security related data with the location and usage information reported by the one or more mobile devices via the network; and responsive to detecting a current location of the one or more mobile devices for the user and a risk level for the current location deviates from the one or more selected locations and selected usage beyond a threshold specified by the user, triggering, by the computer system, the one or more actions specified by the user for the particular mobile device, wherein the one or more actions comprises triggering one or more secondary levels of authentication at the particular mobile device.

6. The method according to claim 5; further comprising:

triggering, by the computer system, the one or more actions specified by the user for the particular mobile device, wherein the one or more actions comprises triggering one or more communications indicating the current location of the one or more mobile devices and an assessed action required via the network via one or more communication channels specified in the contact information.

7. The method according to claim 1, wherein responsive to detecting a current location of the one or more mobile devices for the user deviates from the one or more selected locations and selected usage beyond a threshold specified by the user, triggering, by the computer system, via the network, one or more secondary levels of authentication at the one or more mobile devices further comprises:

triggering, by the computer system, via the network, the one or more secondary levels of authentication at the one or more mobile devices by sending a trigger communication to the one or more mobile devices, wherein a separate security controller at each of the one or more mobile devices receives the trigger communication, locks access to one or more types of functionality, and triggers one or more types of secondary levels of authentication.

8. The method according to claim 1, further comprising:

monitoring, by the computer system, for an expected communication from the one or more mobile devices during a time period;

responsive to not detecting the expected communication from the one or more mobile devices during a time period, triggering, by the computer system, one or more user selected actions for managing a lack of communication;

responsive to detecting the expected communication and the expected communication comprising an authenticated location indicator, indicating, by the computer system, that the one or more secondary levels of authentication at the one or more mobile devices are verified, updating the plurality of locations and usage of the one or more mobile devices with the verification of the current location; and responsive to detecting the expected communication and the expected communication comprising a compromised location data indicator, updating, by the computer system, the plurality of locations and usage of the one or more mobile devices to indicate the current location is compromised.

\* \* \* \* \*